United States Patent
De Lazzari

(10) Patent No.: US 11,895,115 B2
(45) Date of Patent: Feb. 6, 2024

(54) MATCH LIMITS FOR DATING APPLICATION

(71) Applicant: Sidekick Dating, Inc., West Vancouver (CA)

(72) Inventor: Michael Robert De Lazzari, West Vancouver (CA)

(73) Assignee: Sidekick Dating, Inc., West Vancouver (CA)

(*) Notice: Subject to any disclaimer, the term of this patent is extended or adjusted under 35 U.S.C. 154(b) by 0 days.

(21) Appl. No.: 18/142,738

(22) Filed: May 3, 2023

(65) Prior Publication Data

US 2023/0368311 A1    Nov. 16, 2023

Related U.S. Application Data

(60) Provisional application No. 63/342,564, filed on May 16, 2022.

(51) Int. Cl.
| | |
|---|---|
| G06Q 10/00 | (2023.01) |
| H04L 9/40 | (2022.01) |
| G06Q 50/00 | (2012.01) |
| H04L 67/306 | (2022.01) |
| H04L 51/52 | (2022.01) |
| H04L 51/212 | (2022.01) |

(52) U.S. Cl.
CPC ......... *H04L 63/0884* (2013.01); *G06Q 50/01* (2013.01); *H04L 51/212* (2022.05); *H04L 51/52* (2022.05); *H04L 67/306* (2013.01)

(58) Field of Classification Search
CPC .............................. G06Q 50/01; H04L 67/306
See application file for complete search history.

(56) References Cited

U.S. PATENT DOCUMENTS

| | | | |
|---|---|---|---|
| 9,672,336 | B1 | 6/2017 | Spence |
| 10,548,001 | B1 * | 1/2020 | Shelley ............... H04L 51/10 |
| 10,721,226 | B1 | 7/2020 | Kurani et al. |
| 2010/0088246 | A1 * | 4/2010 | Lim ................... G06Q 30/0241 |
| | | | 705/14.4 |
| 2014/0040368 | A1 | 2/2014 | Janssens |
| 2014/0282874 | A1 | 9/2014 | Bennette |
| 2015/0312257 | A1 | 10/2015 | Antipa et al. |

(Continued)

OTHER PUBLICATIONS

Kaitlyn Tiffany. The Tinder algorithm, explained. Retrieved at https://www.vox.com/2019/2/7/18210998/tinder-algorithm-swiping-tips-dating-app-science. Mar. 18, 2019. (Year: 2019).*

(Continued)

*Primary Examiner* — Gabrielle A McCormick
(74) *Attorney, Agent, or Firm* — Raubvogel Law Office

(57) ABSTRACT

One issue with many dating applications is that the number of matches can become overwhelming, making it difficult for a user to continue to communicate meaningfully with those individuals with whom they have been matched. According to various techniques described herein, a limit can be placed on the number of active matches (or conversations) for each user, and the user's profile may be temporarily hidden from view of other individuals when this limit has been reached. Such a condition is referred to as "saturation." Once the user unmatches one or more individuals, so that they are no longer at the maximum, their profile may again be made available and therefore visible to other individuals.

24 Claims, 32 Drawing Sheets

(56) References Cited

U.S. PATENT DOCUMENTS

| | | |
|---|---|---|
| 2016/0112363 A1 | 4/2016 | Jackson |
| 2017/0024700 A1 | 1/2017 | Shahulhameed |
| 2017/0300935 A1 | 10/2017 | Herbst et al. |
| 2018/0096074 A1* | 4/2018 | Gueye ................ G06Q 30/0252 |
| 2019/0132131 A1 | 5/2019 | Clements |
| 2019/0342096 A1 | 11/2019 | Starosielsky et al. |
| 2019/0392008 A1 | 12/2019 | Sharp et al. |
| 2020/0296097 A1 | 9/2020 | Caluwaert |
| 2020/0344214 A1 | 10/2020 | Ding et al. |
| 2022/0158965 A1 | 5/2022 | Bondarenko et al. |

OTHER PUBLICATIONS

Natalie Arroyo Camacho. "'I'm a Dating Specialist, and Here's Why I Recommend Talking To 3 Suitors at Once'". Retrieved at https://www.wellandgood.com/number-matches-dating-app/. Apr. 30, 2022. (Year: 2022).*
Iovine "Tinder to make ID verification available worldwide", Aug. 16, 2021.
Matthews "DateID Allows Singles to Screen Potential Partners Before They Meet Up", Apr. 2, 2020.
Silva "How To: Verified Dating Profiles using Bloom", Jul. 27, 2020.
Thompson "How to verify your Tinder profile", Jul. 20, 2021.
Trotman "Fluttr launches UK's first dating app requiring full ID verification—guaranteeing users protection from fake profiles, catfishing and romance fraud", Feb. 14, 2022.

* cited by examiner

| 501 | 502 | 503 |
|---|---|---|
| Settings | Logo | My Holds & Matches |

Verifier: NAME AND NUMBER OR EMAIL — 551

Re-send questions to verifier — 552
Designate another verifier — 553

Bio:

Name:
Date of birth:
Educational background:
Job status:
Height:
Ethnicity:
Preferred gender:
Religion:
Children:
Fitness:

541

542

How your Verifier describes you:

Your Loyalty:
Your honesty:
Your kindness:
Your sense of humour:
Your communication skills:

*FIG. 5F*

550

```
//***************************************************
//  Control parameters which affect any particular  **
//  embodiment of the "Match Limits" Algorithm       **
//***************************************************
#define   M   (3)   /* Maximum number of Matches before Match Saturation occurs. */
#define   K   (2)   /* Number of Nodes required which must mutually issue   */
                    /* "Likes" to each other in order for a Match to be     */
                    /* declared between all of them.                        */
                    /* This value is commonly set to = 2, but need not be.  */
                    /* It must always be greater than 1                     */ typedef enum StateOfMatchingSystem
{
  k_SOMS_CanAcceptNewMatches,
  k_SOMS_MatchLimitsSaturated,
} StateOfMatchingSystem_t;

//***************************************************
//  Global Variables                                 **
//***************************************************
StateOfMatchingSystem_t   g_MatchLimitsState;
int                       g_TotalAccumulatedMatches;

//------------------------------------------------------
//  Start of "Executable" Pseudo-Code Instructions  **
//------------------------------------------------------ int   main(void)
{
  //********************
  //  Initialization  **
  //********************
  g_MatchLimitsState = k_SOMS_CanAcceptNewMatches;
  g_TotalAccumulatedMatches = 0;
```

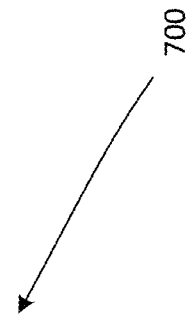

FIG. 7A

```
//***************************************
// ** Main Event-Processing Loop **                                                              700
//***************************************
while (true)
{
    Event   anEvent = waitForEvent();
                        // Acquire next event, whether it be a User Action
                        // or a Network Received Message
    switch (anEvent)
    {
        case kEvent_LocalUser_IsBrowsing_OtherUsers_Profiles:
                                                                                          700A
        if (g_MatchLimitsState == k_SDMS_CanAcceptNewMatches)
            DisplayAnotherUsersProfileAndPictures_OnScreen();
            //
            //   Local User can only browse Other Users
            //   if the current total number of Matches
            //   is <= M (M = 3 in this example)
            //
        break;
        }  // end "case kEvent_LocalUser_IsBrowsing_OtherUsers_Profiles:"

case kEvent_UserRequests_ToIssue_A_Like_To_CurrentlyDisplayed_OtherUser:

if (g_MatchLimitsState == k_SDMS_CanAcceptNewMatches)
        {
            //
            //  Transmit A_Like FromThisUser_To_CurrentlyDisplayed_OtherUser()
            if (!is_CurrentlyDisplayed_OtherUser_MatchLimitsState() != k_SDMS_MatchLimitsSaturated ?
                CurrentlyDisplayed_OtherUser is
                NOT in Matches Saturated state,
                and thus is able to accept a "Like" from us (Local User)
            if (!had_CurrentlyDisplayed_OtherUser_AlreadyIssuedMe_A_Like() ?)
            {
                //   Yes, record a "MATCH"!
                g_TotalAccumulatedMatches += 1;
                //   Increment total number of Matches
                //   that will now be in effect
                                                                                         700B
                if (g_TotalAccumulatedMatches >= M)
                {
                    //   MATCH LIMITS Reached!
                    //   Set MATCHES_SATURATED state
                    g_MatchLimitsState = k_SDMS_MatchLimitsSaturated;
                }
```

MATCH LIMITS FOR DATING APPLICATION

CROSS-REFERENCE TO RELATED APPLICATION

This application claims the benefit of U.S. Provisional Patent Application Ser. No. 63/342,564, filed on May 16, 2022 and entitled "Dating Application", which is incorporated by reference as though set forth herein in its entirety.

This application is related to U.S. Utility patent application Ser. No. 18/142,737, filed on May 3, 2023 and entitled "Verifier-Built Profiles for Dating Application", which is incorporated by reference as though set forth herein in its entirety.

This application is related to U.S. Utility patent application Ser. No. 18/142,739, filed on May 3, 2023 and entitled "Temporary Holds for Dating Application", which is incorporated by reference as though set forth herein in its entirety.

TECHNICAL FIELD

The present document relates to improved mechanisms and features for a dating application.

BACKGROUND

Dating applications offer functionality for allowing individuals to connect with one another, either for casual or long-term relationships. Typically, each user of a dating application inputs information about themselves, including interests, physical characteristics, family history, demographic information, and/or the like, as well as information about the type of person they would like to meet. Often the user may be given an opportunity to upload a picture of themselves as well.

Such information, collectively referred to as a "profile", may then be used by a back-end process to match users with one another. Prospective matches may be made based on expected compatibility between users, and/or other factors. Once matches are established, the matched users can communicate with one another and progress their relationship to the next level, as desired.

SUMMARY

One issue with many dating applications is that the number of matches can become overwhelming, making it difficult for a user to continue to communicate meaningfully with those individuals with whom they have been matched. According to various techniques described herein, a limit can be placed on the number of active matches (or conversations) for each user, and the user's profile may be temporarily hidden from view of other individuals when this limit has been reached. Such a condition is referred to as "saturation." Once the user unmatches one or more individuals, so that they are no longer at the maximum, their profile may again be made available and therefore visible to other individuals.

In various embodiments, the match limit may be a fixed and/or preset number, or it may be dynamically determined according to a current situation or context. In another embodiment, it may be configurable via a settings or preferences option.

Further details and variations are described herein.

BRIEF DESCRIPTION OF THE DRAWINGS

The accompanying drawings, together with the description, illustrate several embodiments. One skilled in the art will recognize that the particular embodiments illustrated in the drawings are merely exemplary, and are not intended to limit scope.

FIGS. 5A through 5J depict examples of various screens that may be presented to a user as they interact with the system.

FIGS. 7A through 7D depict an example of pseudocode that can be used to implement the techniques described herein, according to one embodiment.

DETAILED DESCRIPTION OF THE EMBODIMENTS

Figure 1:
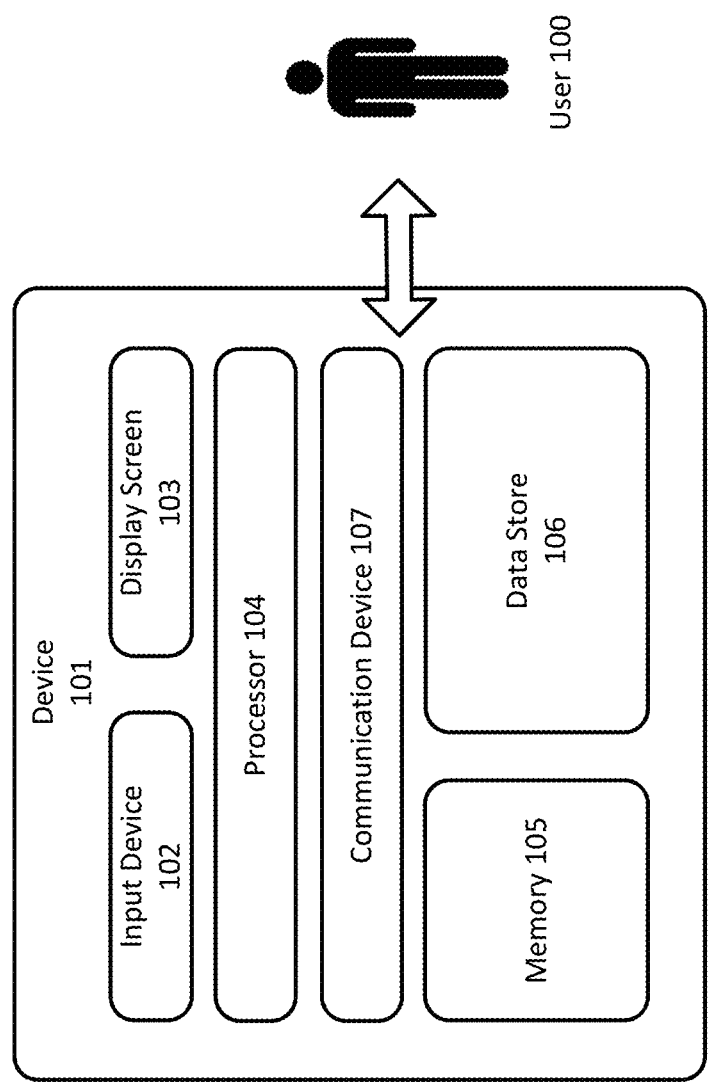
FIG. 1 is a block diagram depicting a hardware architecture for implementing the techniques described herein according to one embodiment.

In various embodiments, as described in more detail herein, a dating application may place limits on the number of matches (also referred to as "strong connections") a user may have at any given time.

In some embodiments, one or more components, as shown and described below in connection with FIGS. 1 and 2, may be used to implement the system and method described herein. In at least one embodiment, such components may be implemented in a cloud computing-based client/server architecture, using, for example, Amazon Web Services, an on-demand cloud computing platform available from Amazon.com, Inc. of Seattle, Washington. Therefore, for illustrative purposes, the system and method are described herein in the context of such an architecture. One skilled in the art will recognize, however, that the systems and methods described herein may be implemented using other architectures, such as for example a standalone computing device rather than a client/server architecture.

Further, the functions and/or method steps set forth herein may be carried out by software running on one or more of the device 101, client device(s) 108, server(s) 110, and/or other components. This software may optionally be multi-function software that may be used to retrieve, store, manipulate, and/or otherwise use data stored in data storage devices such as data store 106, and/or to carry out one or more other functions.

For illustrative purposes, the system and method are described herein in the context of a dating application. However, one skilled in the art will recognize that similar techniques may be used in other contexts as well. For example, the techniques described herein may be used in any context in which it may be useful or appropriate to establish prospective matches between one user (or entity) and other, such as for example:
- a business context in which a company seeks funding or partnership with other entities;
- a hiring context in which employers may be seeking suitable employees, and vice versa; or a gaming or sports context, in which players may be seeking opponents or teammates for a sport or game that may be suitable in terms of skill, geography, and/or other factors.

In particular, the described techniques may be used to place limits on matches in any of these contexts, or in any other suitable context, wherein it may be undesirable to allow an unlimited number of matches.

Definitions and Concepts

For purposes of the description herein, a "user", such as user 100 referenced herein, may be an individual, enterprise, or other group, which may optionally include one or more users. The term "user" may refer to an individual, client, customer, company, association, organization, stakeholder, and/or the like, or an agent for any of these. In at least one embodiment, the term "user" need not be limited to refer to a human being, but can also include any other decision-making process or entity, whether artificial or organic in nature.

In at least one embodiment, a user may create an account ("node") within the system, such as within a dating application ("app"). As described in more detail herein, the user may provide "biographical information" about themselves, which includes any information that describes the user and/or their interests; such biographical information may generally be visible to other users within a network of interconnected nodes. Biographical information may include, for example, physical characteristics, educational background, employment status, and/or the like. Biographical information may also include personality trait information, such as, for example, rankings of loyalty, honesty, and/or the like.

"Self-verification" refers to a process by which a user may provide their own biographical information themselves.

"Third-party verification" refers to a process by which an entity other than the user may provide biographical information about the user. The entity providing the information, who may be referred to as a "verifier," may be another user, or any other entity, individual, or intelligent system. The verifier may be appointed by the primary user. The verifier may or may not be a user of the app.

A "data store", such as data store 106 referenced herein, may be any device capable of digital data storage, including any known hardware for nonvolatile and/or volatile data storage. A collection of data stores 106 may form a "data storage system" that may be accessed by multiple users. A "computing device", such as device 101 and/or client device(s) 108, may be any device capable of digital data processing. A "server", such as server 110, may be a computing device that provides data storage, either via a local data store, or via connection to a remote data store. A "client device", such as client device 108, may be an electronic device that communicates with a server, provides output to a user, and accepts input from a user.

A "like" may refer to an indication of interest in another user. A user may issue a "like" to another user, which results in the other user being notified that they have been "liked". "Likes" may be public (viewable by other users of the application), or private (only viewable by the target of the "like").

A "match" may refer to a relationship between two users that may be established, for example, when two users indicate an interest each other. This may occur, for example, when one user invites the other user to be matched, and the other user accepts. These invitations may take the form of "likes". The term "match" may also be used to refer to a user with whom another user has been matched. Thus, for example, if a match is established between users A and B, the term "match" may also refer to user B when discussing the operation of the system from the point of view of user A. The term "match" may also be used in verb form, for example to establish a relationship between two users. Conversely, the term "unmatch" may refer to termination of a match relationship.

A "conversation" may refer to an ongoing communication between users, such as for example a series of messages that may be enabled between users who have been matched.

System Architecture

According to various embodiments, the systems and methods described herein may be implemented on any electronic device or set of interconnected electronic devices, each equipped to receive, store, and present information. Each electronic device may be, for example, a server, desktop computer, laptop computer, smartphone, tablet computer, and/or the like. As described herein, some devices used in connection with the systems and methods described herein may be designated as client devices, which may be generally operated by end users. Other devices may be designated as servers, which generally conduct back-end operations and communicate with client devices (and/or with other servers) via a communications network such as the Internet. In at least one embodiment, the techniques described herein may be implemented in a cloud computing environment using techniques that are known to those of skill in the art.

In addition, one skilled in the art will recognize that the techniques described herein may be implemented in other contexts, and indeed in any suitable device, set of devices, or system capable of interfacing with existing enterprise data storage systems. Accordingly, the following description is intended to illustrate various embodiments by way of example, rather than to limit scope.

Referring now to FIG. 1, there is shown a block diagram depicting a hardware architecture that may be used for practicing the described system, according to one embodiment. Such an architecture may be used, for example, for implementing the techniques of the system in a computer or other device 101. Device 101 may be any electronic device.

In at least one embodiment, device 101 may include a number of hardware components that are well known to those skilled in the art. Input device 102 may be any element that receives input from user 100, including, for example, a keyboard, mouse, stylus, touch-sensitive screen (touchscreen), touchpad, trackball, accelerometer, microphone, or the like. Input may be provided via any suitable mode, including for example, one or more of: pointing, tapping, typing, dragging, and/or speech. In at least one embodiment, input device 102 may be omitted or functionally combined with one or more other components.

Data store 106 may be any magnetic, optical, or electronic storage device for data in digital form; examples include read-only memories (ROMs), random access memories (RAMs), flash memory, magnetic or solid state drives, or the like. In at least one embodiment, data store 106 may store information that may be utilized and/or displayed according to the techniques described below. Data store 106 may be implemented in a database or using any other suitable arrangement. In another embodiment, data store 106 may be stored elsewhere, and data from data store 106 may be retrieved by device 101 when needed for processing and/or presentation to user 100. Data store 106 may store one or more data sets, which may be used for a variety of purposes and may include a wide variety of files, metadata, and/or other data.

In at least one embodiment, data store 106 may store data such as user profiles, images, questionnaire responses, preferences, and/or the like. In at least one embodiment, such data may be stored at another location, remote from device 101, and device 101 may access such data over a network, via any suitable communications protocol.

In at least one embodiment, data store 106 may be organized in an electronic file system, using well known storage architectures and data structures, such as relational databases. Examples include MySQL and PostgreSQL. Appropriate indexing may be provided to associate data elements in data store 106 with each other. In at least one embodiment, data store 106 may be implemented using cloud-based storage architectures such as Amazon S3 and/or Cloudflare.

Data store 106 may be local or remote with respect to the other components of device 101. In at least one embodiment, device 101 may be configured to retrieve data from a remote data storage device when needed. Such communication between device 101 and other components may take place wirelessly, by Ethernet connection, via a computing network such as the Internet, via a cellular network, or by any other appropriate communication systems.

In at least one embodiment, data store 106 may be detachable in the form of a CD-ROM, DVD, flash drive, USB hard drive, and/or the like. Data store 106 may include multiple stores for redundancy, backup, sharding, and/or scalability. Information may be entered from a source outside of device 101 into a data store 106 that may be detachable, and later displayed after the data store 106 is connected to device 101. In another embodiment, data store 106 may be fixed within device 101.

In at least one embodiment, data store 106 may be organized into one or more well-ordered data sets, with one or more data entries in each set. Data store 106, however, may have any suitable structure. Accordingly, the particular organization of data store 106 need not resemble the form in which information from data store 106 is displayed to user 100 on display screen 103. In at least one embodiment, an identifying label may also be stored along with each data entry, to be displayed along with each data entry.

Display screen 103 may be any element that displays information such as text and/or graphical elements. In particular, display screen 103 may present a user interface for entering, viewing, configuring, selecting, editing, and/or otherwise interacting with information associated with the dating application functionality described herein. In at least one embodiment where only some of the desired output may be presented at a time, a dynamic control, such as a scrolling mechanism, may be available via input device 102 to change which information is currently displayed, and/or to alter the manner in which the information is displayed.

Processor 104 may be a conventional microprocessor for performing operations on data under the direction of software, according to well-known techniques. Memory 105 may be random-access memory having a structure and architecture as are known in the art, for use by processor 104 in the course of running software.

Communication device 107 may communicate with other computing devices through the use of any known wired and/or wireless protocol(s). For example, communication device 107 may be a network interface card ("NIC") capable of Ethernet communications and/or a wireless networking card capable of communicating wirelessly over any applicable standards such as, for example, IEEE 802.11. Communication device 107 may be capable of transmitting and/or receiving signals to transfer data and/or initiate various processes within and/or outside device 101.

Figure 2:
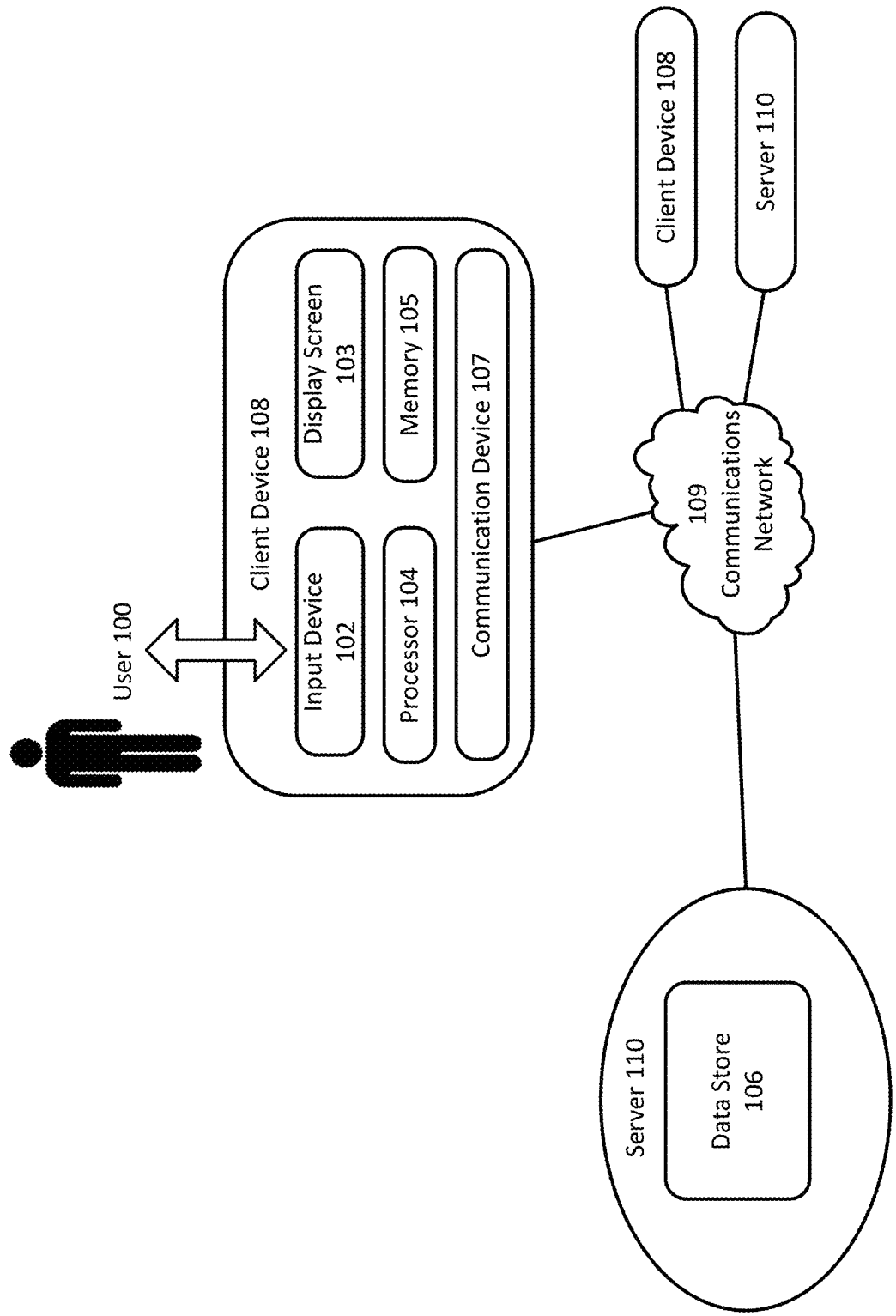
FIG. 2 is a block diagram depicting a hardware architecture for implementing the techniques described herein in a client/server environment, according to one embodiment.

Referring now to FIG. 2, there is shown a block diagram depicting a hardware architecture in a client/server environment, according to one embodiment. Such an implementation may use a "black box" approach, whereby data storage and processing may be done completely independently from user input/output. An example of such a client/server environment may be a web-based implementation, wherein client device 108 runs a browser that provides a user interface for interacting with web pages and/or other web-based resources from server 110. Items from data store 106 may be presented as part of such web pages and/or other web-based resources, using known protocols and languages such as Hypertext Markup Language (HTML), Cascading Style Sheets (CSS), JavaScript, WebAssembly (Wasm), and/or the like.

Client device 108 may be any electronic device incorporating input device 102 and/or display screen 103, such as a desktop computer, laptop computer, cellular telephone, smartphone, handheld computer, tablet computer, kiosk, connected television, game system, wearable device, or the like. Any suitable type of communications network 109, such as the Internet, may be used as the mechanism for transmitting data between client device 108 and server 110, according to any suitable protocols and techniques. In addition to the Internet, other examples include cellular telephone networks, EDGE, 3G, 4G, 5G, long term evolution (LTE), Session Initiation Protocol (SIP), Short Message Peer-toPeer protocol (SMPP), SS7, Wi-Fi, Bluetooth, ZigBee, Hypertext Transfer Protocol (HTTP), Secure Hypertext Transfer Protocol Secure (HTTPS), Transmission Control Protocol/Internet Protocol (TCP/IP), and/or the like, and/or any combination thereof. In at least one embodiment, client device 108 transmits requests for data via communications network 109, and receives responses from server 110 containing the requested data. Such requests may be sent via HTTP as remote procedure calls or the like.

In one implementation, server 110 may be responsible for data storage and processing, and may incorporate data store 106. Server 110 may include additional components as needed for retrieving data from data store 106 in response to requests from client device 108.

As described above in connection with FIG. 1, data store 106 may be organized into one or more well-ordered data sets, with one or more data entries in each set. Data store 106, however, may have any suitable structure, and may store data according to any organization system known in the information storage arts, such as databases and other suitable data storage structures. As in FIG. 1, data store 106 may store event data, appointment data, forecasts, predictions, historical data, and/or the like; alternatively, such data may be stored elsewhere (such as at another server) and retrieved as needed.

In addition to or in the alternative to the foregoing, data may also be stored in a data store 106 that may be part of client device 108. In some embodiments, such data may include elements distributed between server 110, client device 108, and/or other computing devices in order to facilitate secure and/or effective communication between such devices.

As discussed above in connection with FIG. 1, display screen 103 may be any element that displays information such as text and/or graphical elements. Various user interface elements, dynamic controls, and/or the like may be used in connection with display screen 103.

As discussed above in connection with FIG. 1, processor 104 may be a conventional microprocessor for use in an electronic device to perform operations on data under the direction of software, according to well-known techniques. Memory 105 may be random-access memory, having a structure and architecture as are known in the art, for use by processor 104 in the course of running software. A communication device 107 may communicate with other computing devices through the use of any known wired and/or wireless protocol(s), as discussed above in connection with FIG. 1.

In one embodiment, some or all of the system may be implemented as software written in any suitable computer programming language, whether in a standalone or client/server architecture. Alternatively, some or all of the system may be implemented and/or embedded in hardware.

Notably, multiple client devices 108 and/or multiple servers 110 may be networked together, and each may have a structure similar to those of client device 108 and server 110 that are illustrated in FIG. 2. The data structures and/or computing instructions used in the performance of methods described herein may be distributed among any number of client devices 108 and/or servers 110. As used herein, "system" may refer to any of the components, or any collection of components, from FIGS. 1 and/or 2, and may include additional components not specifically described in connection with FIGS. 1 and 2.

In some embodiments, data within data store 106 may be distributed among multiple physical servers. Thus, data store 106 may represent one or more physical storage locations, which may communicate with each other via the communications network and/or one or more other networks (not shown). In addition, server 110 as depicted in FIG. 2 may represent one or more physical servers, which may communicate with each other via communications network 109 and/or one or more other networks (not shown).

In at least one embodiment, the system may implement a dating application wherein a limit can be placed on the number of active matches (or conversations) for each user. In at least one embodiment, the dating application may run on any suitable hardware architecture, including for example that shown in FIG. 1 or 2.

Method

Figure 3:
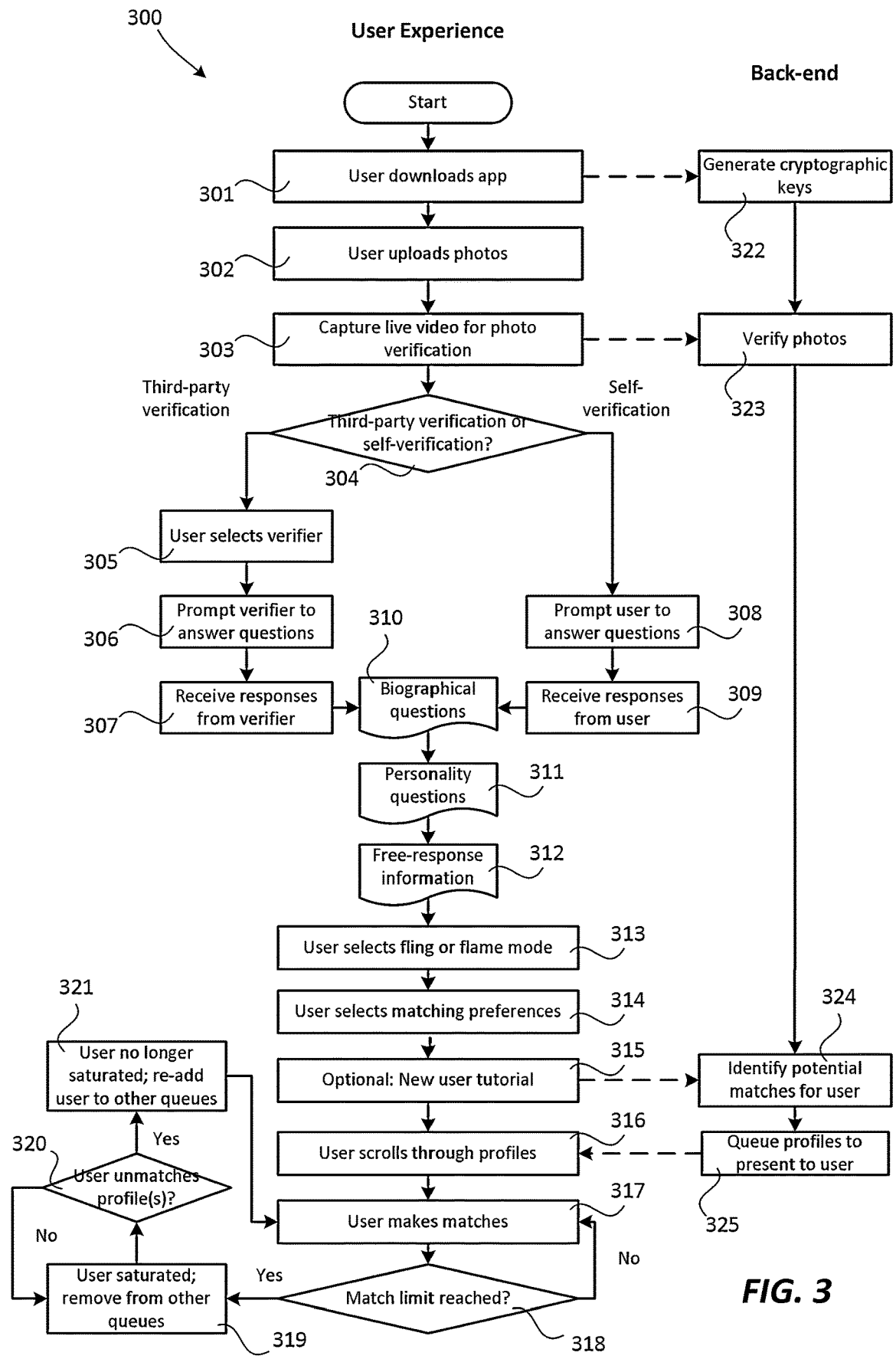
FIG. 3 is a flow diagram depicting a method for generating profiles for a dating application, according to one embodiment.

Referring now to FIG. 3, there is shown a flow diagram depicting a method for generating profiles for a dating application, according to one embodiment. On the left side, the flow diagram depicts steps associated with the user experience in interacting with the system, for example via a software application ("app") running on a smartphone or other computing device. The right side of the diagram depicts steps performed by the app and/or a back-end component running, for example, at a server such as server 110.

User 100 downloads 301 the app. The app may generate 322 cryptographic keys for use in authenticating user 100 and ensuring data security and privacy.

User 100 may be prompted to begin creating a profile by uploading 302 photos of themselves. Such photos may be taken via user's 100 device, or they may be uploaded from an image library, social media account, or other source. In at least one embodiment, the app and/or back-end server 110 may verify 323 the uploaded photos (either prior to uploading them, or once they have been uploaded), so as to make sure the photos conform to size and resolution parameters. One way the photos may be verified is by prompting user 100 to take a live video or photo of themselves 303, and applying facial recognition technology to determine whether the live video or photo matches the uploaded images.

User 100 may then be given a choice 304 between answering profile questions themselves or selecting a third-party verifier to answer the questions. If user 100 chooses self-verification, they may be prompted 308 to answer a series of questions, which may include biographical questions and/or personality questions; user 100 may also be given an opportunity to provide any additional information in a free response information section. User's 100 responses may be received 309 via any suitable user input device.

If, on the other hand, user 100 selects 305 a third-party verifier, such as a friend or other individual who knows user 100, the third-party verifier may be prompted 306 to answer the questions (and/or to provide any additional information about user 100). In at least one embodiment, the third-party verifier may be prompted on their own device, for example via text message, email message, or the like. The third-party verifier's responses may be received 307 and then recorded and associated with user's 100 account. Once the third-party verifier has provided their responses, their role is completed. User 100 may be kept notified of status, for example by being alerted when the third-party verifier has provided their responses.

Whichever option is chosen (third-party verification or self-verification), the system may issue prompts for any type of information that may be relevant. Such prompts may include, for example biographical questions 310, personality questions 311, and/or free-response information 312. The system receives input from the third-party verifier or from user 100 via any suitable input device.

Additional details regarding the use of third-party verification are provided in the above-referenced related application.

In at least one embodiment, user 100 may be given an opportunity to select between additional modes and preferences. For example, user 100 may select 313 between a fling mode (for casual encounters) and a flame mode (for more serious relationships). This selection may be used in determining potential matches, so that users may be matched with other individuals who may be seeking the same type of relationship. User 100 may also be given an opportunity to select 314 other types of matching preferences (referred to as user-selected matching preferences), which may be used in identifying (or eliminating) potential matches.

Once the questionnaire has been completed, either by the third-party verifier or via self-verification, and any other selections of modes and preferences have been made, the system may identify 324 potential matches with other individuals' profiles, using a suitable matching algorithm. Potential matches may be ranked for presentation to user 100 in a queue. In addition, user's 100 position and suitability for other individuals may also be determined, based on user's 100 profile and those of the other individuals.

If appropriate, user 100 may be presented 315 with a new user tutorial to educate them as to the operation of the system.

Once the tutorial is complete, the app queues 325 profiles to show user 100, and determines where user 100 should be placed in queues of other individuals. User 100 may then be given an opportunity to scroll 316 through profiles, which represent individuals that the system has determined to be potential matches for user 100. User 100 may select 317 those profiles that may be of interest, by tapping on a "like" icon. Each such selected profile may be referred to as a "match".

If two users each indicate that they like the other, a "match" is established, and a communication (referred to as a "conversation") may be automatically established between them. In at least one embodiment, this communication may take place within the app itself, for example via text messages.

Once a conversation has been established between two users, either may "unmatch" the other to terminate the conversation. In at least one embodiment, if a user indicates that they want to "unmatch" 320 an individual, a prompt may be displayed, warning user 100 that the conversation cannot be reestablished once lost. User 100 confirms this before the conversation is terminated.

In at least one embodiment, a maximum limit on the number of concurrent (or "active") matches for each user can be specified. When user 100 selects 317 profiles to make matches, a determination may be made 318 as to whether a match limit has been reached. If so, user 100 may be removed (or hidden) 319 from the queues of other users, so that they are (temporarily) not available to match, and are not visible to be "liked" by other users. This condition is referred to as "saturation." If user 100 unmatches 320 profiles so that they are once again below the limit, they may be automatically re-added 321 to the queues of other users.

In at least one embodiment, by enforcing a maximum, the system may limit the number of conversations that user 100 may engage with at any given time, so as to ensure that conversations will be more meaningful. Such an approach may further help to avoid overwhelming user 100 with too many concurrent conversations.

In at least one embodiment, the match limit may be a fixed and/or preset number, such as for example three. In another embodiment, the match limit may vary from user to user, and/or may be configurable via a settings or preferences option, so that it may be configurable by a user and/or administrator. In yet another embodiment, the match limit may be determined based on the service tier the user is currently subscribed to or has purchased.

In yet another embodiment, the match limit may be dynamically determined and/or may change according to a current situation or context. For example, a beginning user may have a lower match limit, and this limit may be increased as the user attains more experience using the system and/or accumulating matches. As another example, the match limit may change based on the number of total users or the number of users within a cohort or subset that includes the user; a higher match limit may be applied when there are more users with whom to match.

One skilled in the art will recognize that the match limit may be set or changed according to any other suitable factors, either in a preset, static, or dynamic manner.

In at least one embodiment, the match limit has no effect on the number of "likes" a user can specify.

Profile Queue

In at least one embodiment, a queue of profiles may be generated and presented to user 100, based on their responses to the questionnaire and on user-selected matching preferences. As described in the above-referenced related application, in at least one embodiment, the queue may also be based on the third-party verifier's responses to the questionnaire concerning user 100. The profile queue may include potential matches that meet the following criteria:
Align with preferred gender and interested partners;
Align with user-selected fling or flame mode;
Identified by internal algorithms as being within a range of two points of user 100 on each personality question metric; and
Align with any additional user-selected matching preferences.

In at least one embodiment, if there are insufficient potential matches to present to user 100, some criteria may be relaxed. For example, the acceptable range (or tolerance) for personality questions may be increased. If, despite such steps, user 100 is still running out of profiles to display, the system may prompt user 100 to change their user-selected matching preferences so as to expand the field of potential matches.

Profiles that satisfy the above-listed conditions may be queued for presentation to user 100. In at least one embodiment, profiles may be presented by order of date created, with older profiles at top of the queue. Profiles that have been verified by a third party may be given more prominent positioning (i.e., higher priority) than self-verified profiles. In addition, profiles for individuals who have sent "likes" to user 100 may be given more prominent positioning than those who have not.

In at least one embodiment, when a user 100 has previously been hidden due to saturation, and may then be brought back into view, any "likes" that were sent by an individual before user 100 was hidden may be shown to user 100 with higher priority, as long as the individual who sent the "like" is still available to the service.

In at least one embodiment, user 100 may "dislike" a profile. Profiles that have been "disliked" by user 100 may be removed from user's 100 queue, and not matched.

In at least one embodiment, profiles that user 100 has decided to hold (or designated as "maybe") may be presented first, every time the app is opened. Such profiles may be held using the "maybe" designation for some period of time, such as 24 hours, after which time they automatically expire, as described in the above-referenced related application.

In at least one embodiment, profiles may be presented to user 100 according to the following rank priority order:
held profiles (i.e., profiles designated as "maybe");
profiles for individuals who sent "likes" before user 100 became hidden due to saturation (if applicable):
profiles for individuals who have sent "likes" to user 100; and
additional profiles, by order of date created (older first) in blocks of 10, with order preference favoring third-party verified profiles.

Additional details are provided below in connection with FIG. 4.

In at least one embodiment, if an individual with a self-verified profile sends a "like" to user 100 or sends a "like" after user 100 became hidden, or is designated as held (or "maybe"), that profile may be ranked in its respective category without regard to its self-verified status. Thus, in at least one embodiment, lower queue rank for self-verified profiles may only come into play when stacked with profiles shown in order of creation date.

In at least one embodiment, profiles may be grouped in blocks by date created, with older profiles presented first. Self-verified profiles may be placed in the same blocks as third-party verified ones; however, in at least one embodiment, third-party verified profiles may be given greater prominence, for example by being listed first within each block. In at least one embodiment, blocks may be separated according to calendar months.

In at least one embodiment, every time the app is opened, after all other higher priority profiles are presented, user 100 may be presented with an oldest block of profiles. The block may contain a predefined number of profiles, including any suitable number of verified profiles and self-verified profiles. For example, a block may include ten profiles, including eight third-party verified profiles followed by two self-verified profiles. If user 100 scrolls through this block of profiles, the system may present the next-oldest block, again including, for example, eight third-party verified profiles followed by two self-verified profiles. This process may continue with successively newer blocks. If user 100 continues to scroll until the most recent block has been passed, the queue may reset to the next group of ten profiles (including, for example, eight third-party verified profiles followed by two self-verified profiles) from the oldest block, and the cycle may repeat.

In at least one embodiment, if there are insufficient potential matches within a block to present the predefined number (such as ten) to user 100, the queue may progress to the next oldest block. If there are insufficient self-verified profiles within a block, third-party verified profiles may be presented in lieu of the self-verified profiles, and vice versa.

As mentioned above, if there are insufficient potential matches to present to user 100, some criteria may be relaxed, by, for example, increasing the acceptable range (or tolerance) for personality questions. Thus, when user 100 runs out of profiles that meet the criteria of user-selected matching preferences and personality internal app matching, they may be presented with matches that align with their user-selected matching preferences, but may not align with the personality internal app matching. In at least one embodiment, a message such as the following may be displayed:

Hey there super-slider! Looks like you've seen the most compatible users that fit your match criteria. You'll continue to see profiles that fit your match criteria, but they may be a little outside your personality traits. You can always change your matching preferences under settings to see more people. You never know what might happen!

If, despite such steps, user 100 is still running out of profiles to display, the system may prompt user 100 to expand their user-selected matching preferences so as to expand the field of potential matches. In at least one embodiment, the following message may be displayed:

It looks like you've seen all the users that fit your match criteria. Try changing your matching preferences under settings to see more people. You never know what might happen!

Figure 4:
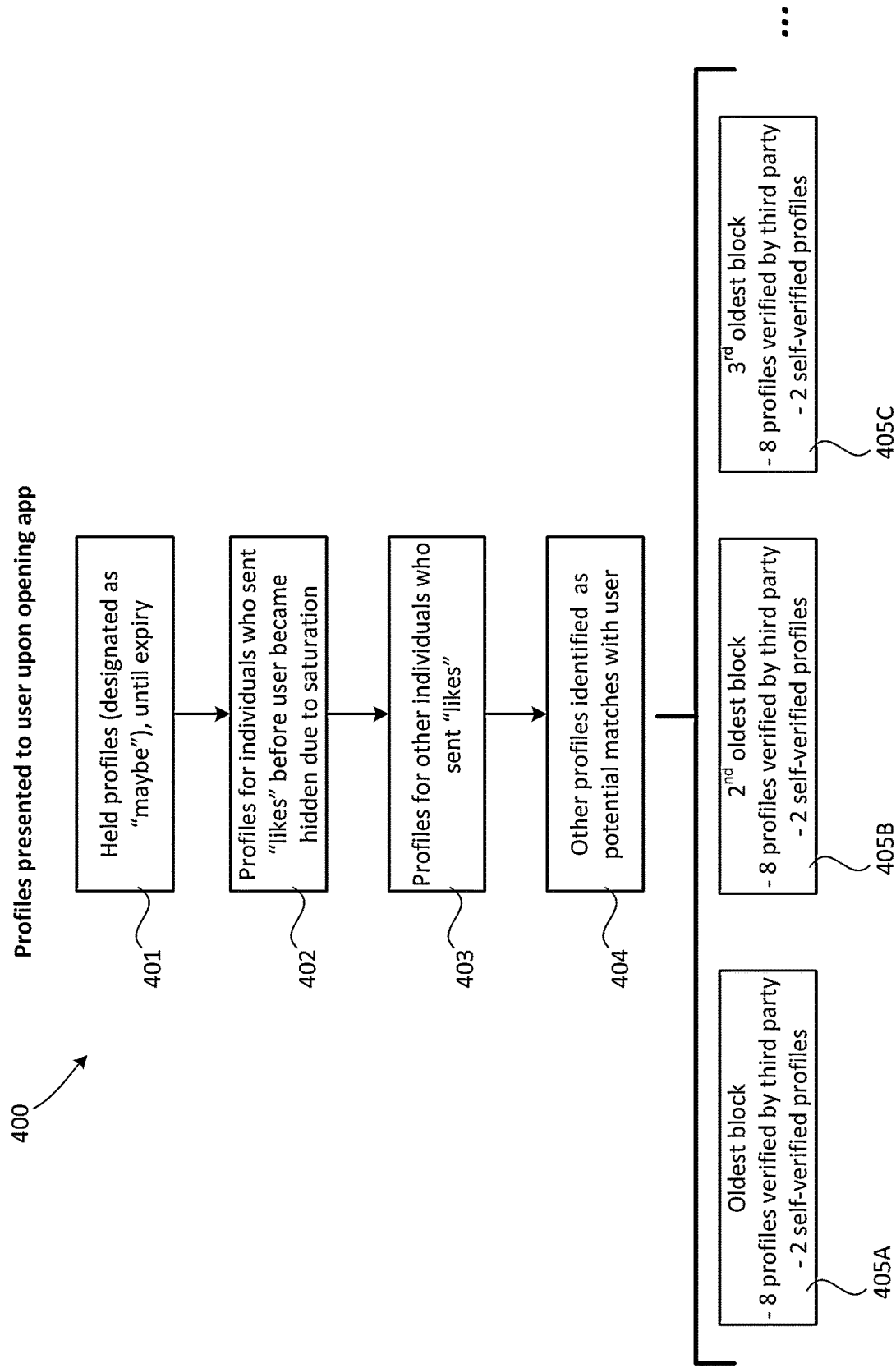
FIG. 4 is a flow diagram depicting an example of a method of presenting profiles to a user, according to one embodiment.

Referring to FIG. 4, there is shown a flow diagram depicting an example of a method 400 of presenting profiles to a user, according to one embodiment.

As shown in the example of FIG. 4, those profiles that have third-party verification may be given more favorable positioning within the queue than self-verified profiles. This reflects the greater degree of trust inherent in verified profiles. In the example of FIG. 4, such third-party-verified profiles may be included in blocks 405A, 405B, and 405C.

In at least one embodiment, the profiles displayed according to the flow diagram of FIG. 4, and included in blocks 401 through 405C, include those that satisfy the various exclusionary and/or match preferences rules that apply, including those that may have been explicitly specified by user 100 and/or those that may be determined based on user's 100 personality and other characteristics.

A certain set of profiles may be presented to user 100 every time the app is opened. In at least one embodiment, user 100 may scroll among these profiles as desired. In at least one embodiment, this set of profiles includes:

held profiles 401 (i.e., those that user 100 has designed as "maybe"), as long as such profiles have not yet expired;
profiles 402 for individuals who sent "likes" before user 100 became hidden due to saturation;
profiles 403 for other individuals who have sent "likes"; and
other profiles 404 identified as potential matches with user 100.

In at least one embodiment, profiles 404 may be presented in blocks according to creation date, for example by calendar month. In each block, priority (or favorable placement) may be given to profiles that are verified by a third party, as opposed to self-verified profiles. For example, blocks 405A, 405B, and 405C may be established, each having ten profiles including eight profiles that are verified by a third party and two that are self-verified. In addition, the verified profiles within each of blocks 405A, 405B, and 405C may be given more prominent placement, for example by being displayed before the self-verified ones. The sizes of blocks 405A, 405B, and 405C, and the number of verified/self-verified profiles in each, may be configured by user 100 or by a system administrator.

Questionnaire

Any suitable questions may be included in the questionnaire. In general, such questions may be designed to assist the system in determining potential matches with other users. Questions may include prompts for biographical information, personality information, and/or any other type of information.

Biographical Information

Specific examples of questions associated with biographical information (along with examples of response format) include:

What is your (friend's) name? (free response)
What is your (friend's) date of birth? (scrolling wheel)
What is your (friend's) education? (select from high school or equivalent, diploma, undergrad, graduate)
What is your (friend's) job status? (employed, unemployed, student)
What is your (friend's) height (scrolling wheel)
What is your (friend's) ethnicity? (select from list of recognized ethnicities, with option of other); in at least one embodiment, the system notifies user 100 or third-party verifier that user 100 may specify how they will be identified in their profile
What is your (friend's) preferred gender? (man, woman, other); in at least one embodiment, the system notifies user 100 or third-party verifier that user 100 may specify how they will be identified in their profile
What is your (friend's) religion? (select from list of recognized ethnicities, with option of other); in at least one embodiment, the system notifies user 100 or third-party verifier that user 100 may specify how they will be identified in their profile
Is your friend/are you interested in: men, women, everyone (pick one of 3)
Is your friend/are you: average, athletic, very athletic (pick one of 3)

In at least one embodiment, the system may determine potential matches based in part on such biographical information by, for example, only showing potential matches that align the preferred gender and interested partners.

Personality Information

Specific examples of questions associated with personality information (along with examples of response format) include:

How would you rate your (friend's) loyalty? (sliding scale from 1-10)

How would you rate your (friend's) honesty? (sliding scale from 1-10)

How would you rate your (friend's) kindness? (sliding scale from 1-10)

How would you rate your (friend's) humor? (sliding scale from 1-10)

How would you rate your (friend's) communication skills? (sliding scale from 1-10)

In at least one embodiment, the system may determine potential matches based in part on such personality information by, for example, only showing potential matches who are within a range/tolerance of two points of each other on each metric. In addition, in at least one embodiment, such personality information may be selectively ignored (or the range/tolerance may be relaxed) in favor of user-selected matching preferences (as described below) if user 100 is running out of potential matches to scroll through. If the queue of potential matches becomes depleted, user 100 may be prompted to change their preferences, so as to expand the pool of potential matches.

User-Selected Matching Preferences

As mentioned above, in at least one embodiment, user 100 may be given an opportunity to explicitly specify matching preferences that are to be used in identifying (or eliminating) potential matches. These are optional, and user 100 may elect to provide no answer if desired. Examples of such user-selected matching preferences (along with examples of response format) include:

Age (sliding scale from 18-100)

Education (high school or equivalent, diploma, undergraduate, graduate)

Height range (sliding scale to select range)

Ethnicity (list of recognized ethnicities)

Religious beliefs (list of recognized major religions)

Fitness (average, athletic, very athletic)

Job status (employed, unemployed, student)

Geographic distance (sliding scale to select range)

In at least one embodiment, the system may queue potential matches based on the above user-selected matching preferences.

In addition, as mentioned above, in at least one embodiment, the system only identifies potential matches that align with user's 100 selection between fling mode (for casual encounters) and flame mode (for more serious relationships).

User Interface

In at least one embodiment, the various steps depicted in FIG. 3 may each be associated with specific inputs, prompts, and/or outputs. The following are examples of additional details for the various depicted steps, along with examples of inputs, prompts, and/or outputs.

Once user 100 has downloaded the app, they may select a subscription option. In at least one embodiment, user 100 may be automatically enrolled in an opt-out subscription on a monthly basis, beginning with a first month's payment that takes place, for example, via an app store upon download. Monthly payments may be pre-paid for the next month; once a billing date has passed, user 100 may be charged for the month regardless of whether the app or service is used for the entirety of that month. If user 100 cancels their subscription, the cancellation may take effect at the beginning of the next billing cycle.

Upon download and receipt of payment, a welcome message may be presented. For example:

Welcome to Sidekick!

Before we begin, there is something important you need to know: We will never store or sell your personal identification data. While you build your profile, we'll be working behind the scenes to generate unique crypto keys for you to make sure your information is safe—even we can't crack them!

Upon user 100 acknowledgement, user 100 may be prompted to begin generating their profile, as follows:

Help us get to know you better. It's time to build your profile.

Let's start with some pictures. Upload a minimum of 6 clear photos of yourself from your device (8 max). Try to pick pictures that represent the unique things that make you, you! Please make sure at least one photo is a clear headshot (like a selfie)—this will help us with the next step.

You can tap, hold, and slide your pictures to change the order of how they appear on your profile. The big picture at the top will be seen first.

User 100 may then upload photos and specifies the order in which they should appear.

Next, photos may be verified by the app. User 100 may be prompted to record a video to enable photo verification, as follows:

Let's make sure this is you! Tap the button to record a video of you waving your hand, while keeping your face clearly visible in frame. We'll use this to check your submitted photos, in real time.

Once user 100 has recorded the video, the back-end system (hosted, for example, on server 110), checks whether the video matches the uploaded photos, using facial recognition technology.

If the verification fails, user 100 may be prompted to try again or to upload new photos, as follows:

We're sorry. We seem to be having a hard time checking your photos right now. Please try again. If this keeps happening, make sure one of your profile pictures is a clear headshot.

If the verification succeeds, the setup process continues. User 100 may be prompted to provide answers to profile questions. As mentioned above, user 100 may be given a choice between answering the profile questions themselves or selecting a third-party verifier to answer the questions, as follows:

We have 10 quick questions about you (things like your name and age), and 5 super quick questions about your personality (such as your kindness and sense of humor) to help build your profile.

This won't take more than a couple minutes, we promise! You can either answer these questions yourself, or you can ask a friend (we'll call them a verifier) to do it for you. If you choose a verifier, we'll send them a link to complete these questions on their own device. You can see their answers under your profile settings. If you don't think your verifier got you just right, you can always re-send them the link, or send it to someone else. If you answer these questions yourself, you can see and change your answers at any time. Profiles that use a verifier are marked with this symbol, as follows: [The symbol or icon used to indicate a third-party verified profile is displayed here.]

User 100 then selects between self-verification and third-party verification. If user 100 selects third-party verification, additional steps may be performed, as described in the above-referenced related application.

As mentioned above, user 100 may select between a fling mode (for casual encounters) and a flame mode (for more serious relationships). For example, the following prompt may be presented:

> We want to make sure everyone is on the same page about what they're looking for. You can use Sidekick in either Fling or Flame mode: Fling for something casual, Flame for something more. You will only be shown profiles in the same mode. You can change this at any point under settings.

Once user 100 has selected fling or flame mode, they may be given an opportunity to select user-selected matching preferences, which may be used in identifying (or eliminating) potential matches. For example, the following prompts may be presented:

> Everyone has their unique preferences. You can filter profiles based on the categories below, or choose no preference for each.

Various input fields and controls are then shown, as described above.

Once user 100 has provided the requested information, the profile may be ready. If the system is still awaiting a response from the third-party verifier, the following message may be presented:

> We're all done! We just have to wait for [VERIFIER'S NAME] to get back to us, and you'll be ready to start. We'll send you a notification!

In at least one embodiment, the main profile browsing screen may be hidden or grayed out until the third-party verifier has provided answers to the questions.

In at least one embodiment, a notification may be provided once the third-party verifier has provided answers or self-verification is complete, as follows:

> You're all set up! It's time to get started!

In at least one embodiment, user 100 may be given an opportunity to view a tutorial that guides them though the process of viewing profiles and indicating potential matches. The following is an example of prompts and output for the tutorial:

> Before you begin, let's quickly show you how Sidekick works.
> If you ever want to change your Fling or Flame mode, matching settings, designate a new verifier, or edit any of your information in self-verification mode, just hit settings. [Graphic to show settings being touched and menu options appearing while text displayed]
> [Graphic to show sidekick logo button being touched and model profile appearing before text]
> When looking through profiles, scroll down to see additional pictures. [Graphic to depict an example]
> Slide left to skip, and right to like. [Graphic to depict an example]
> If you accidentally skip a profile, tap slideback to see it again. [Graphic to depict an example]
> If you're not sure about someone just yet, you can save (Hold) up to 3 profiles for 24 hours. [Graphic to depict an example]
> Tap My Holds and Matches to have another look at your saved profiles, and message your matches. [Graphic to depict an example]
> If you would like unmatch a user, tap the unmatch symbol on your messages
> Sidekick is designed to match you with compatible people and provide meaningful connections. You can have a maximum of 3 matches/conversations at any time. When you do, your profile will be temporally hidden until you unmatch a current connection. This keeps things simple so you can focus on what matters.
> Sidekick is built on trust and verification. The encryption and identity protection we employ prevents us from accessing or tracking your information, including the messages you send to your matches. Sidekick is a self-policing network, made of genuine users looking for real connections. Please follow the golden rule, and treat others how you like to be treated.

FIGS. 5A through 5J depict examples of various screens that may be presented to user as they interact with the system. One skilled in the art will recognize that the particular layouts and arrangements presented in the Figures are merely exemplary, and that the functionality described herein may be implemented using other layouts and arrangements.

Figure 5A:
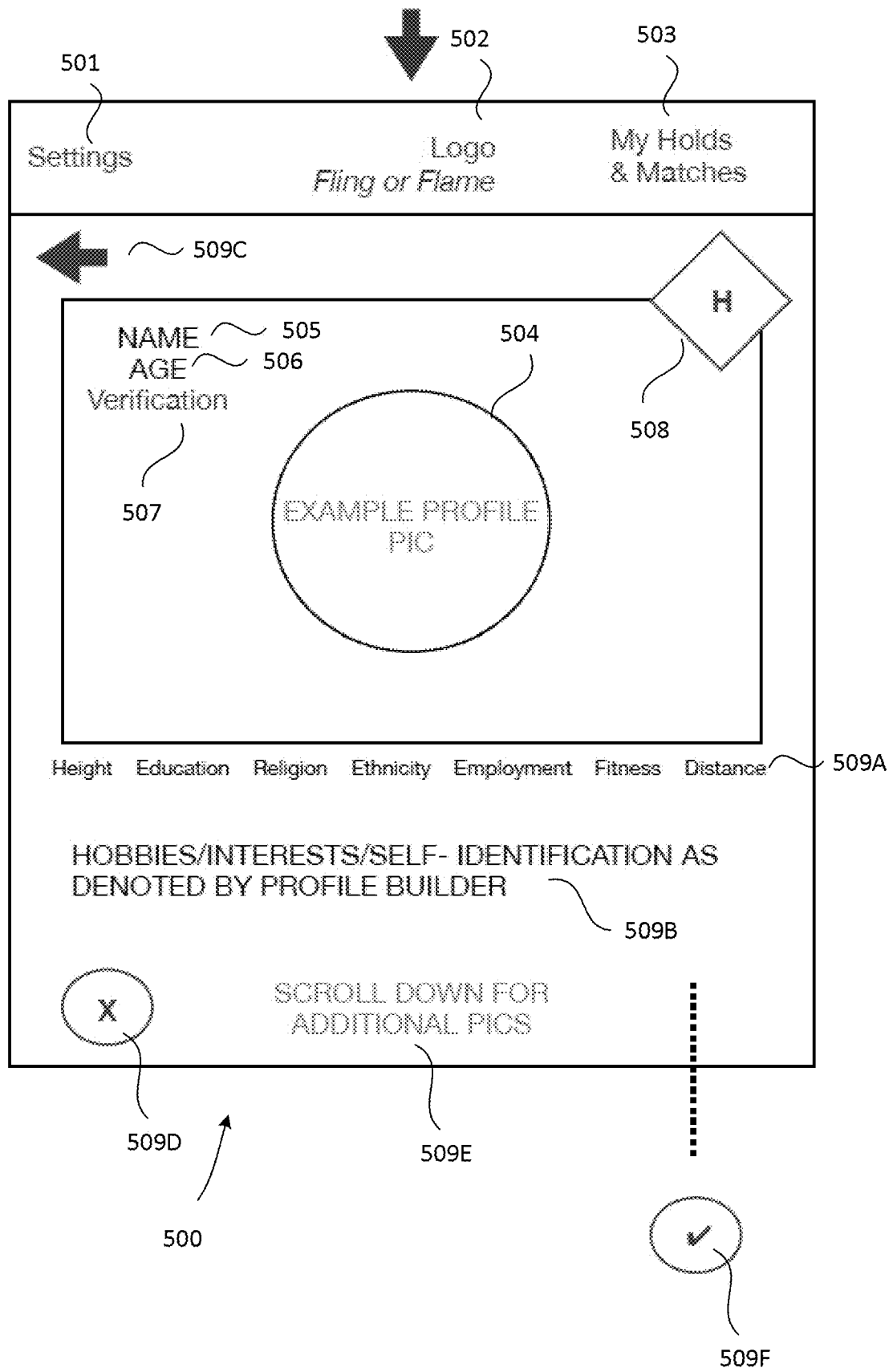
Figure 5B:
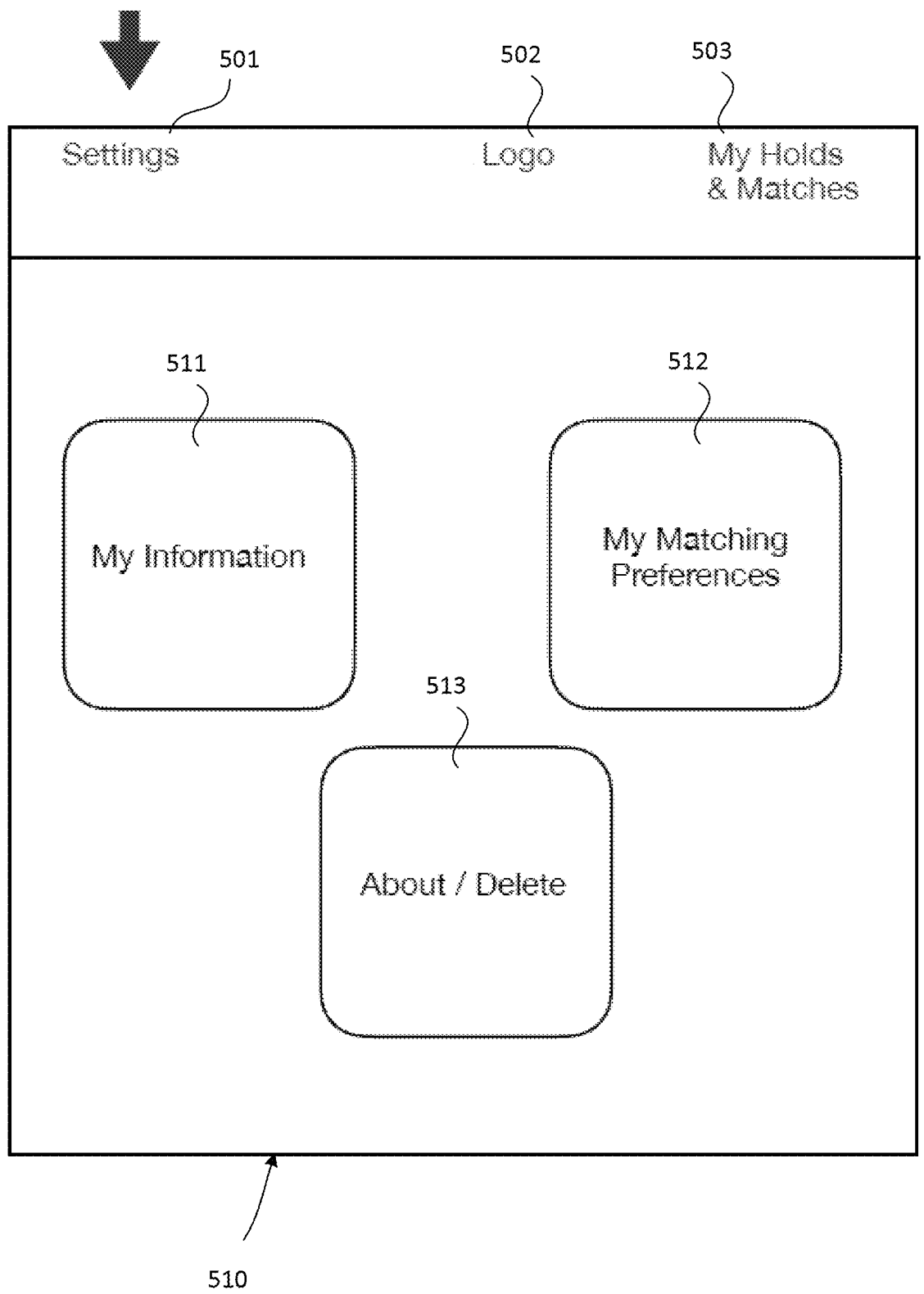
Figure 5C:
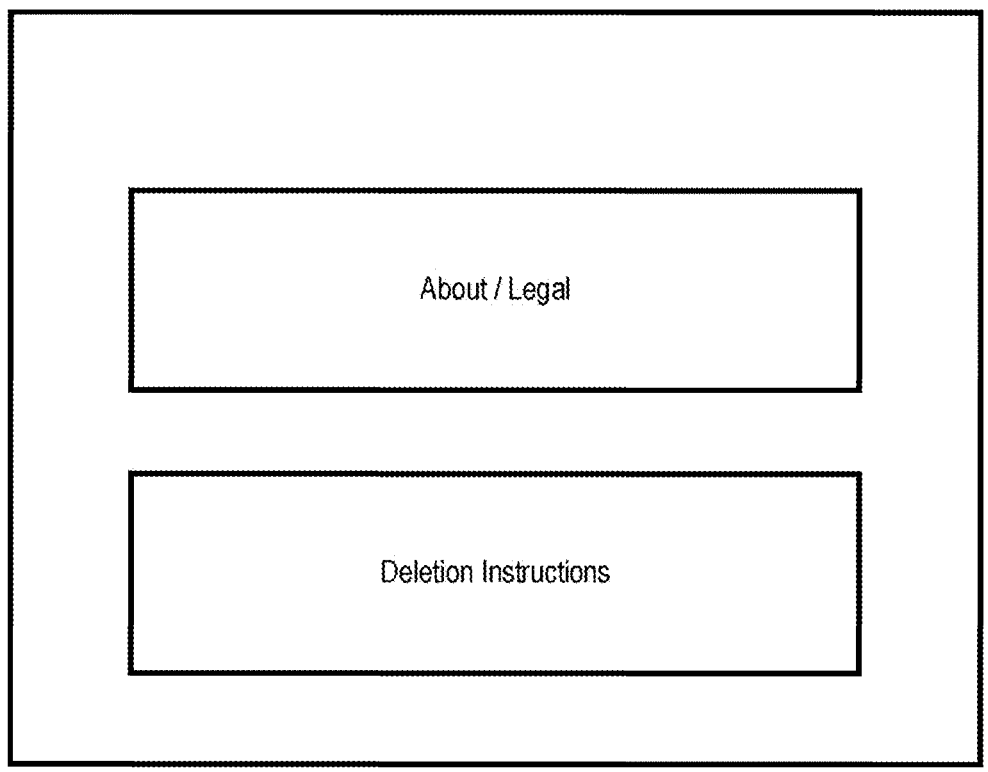
Figure 5D:
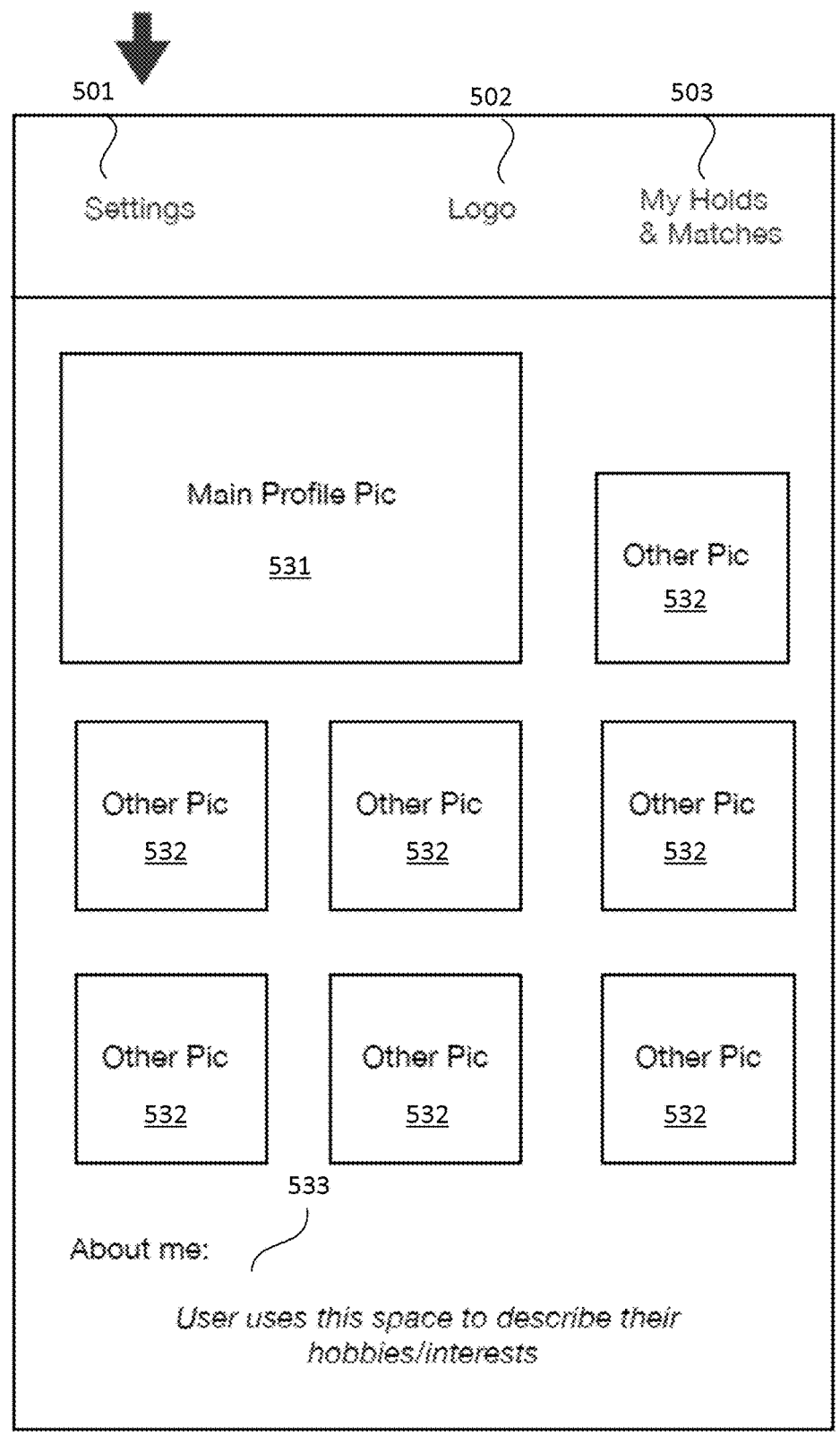
Figure 5E:
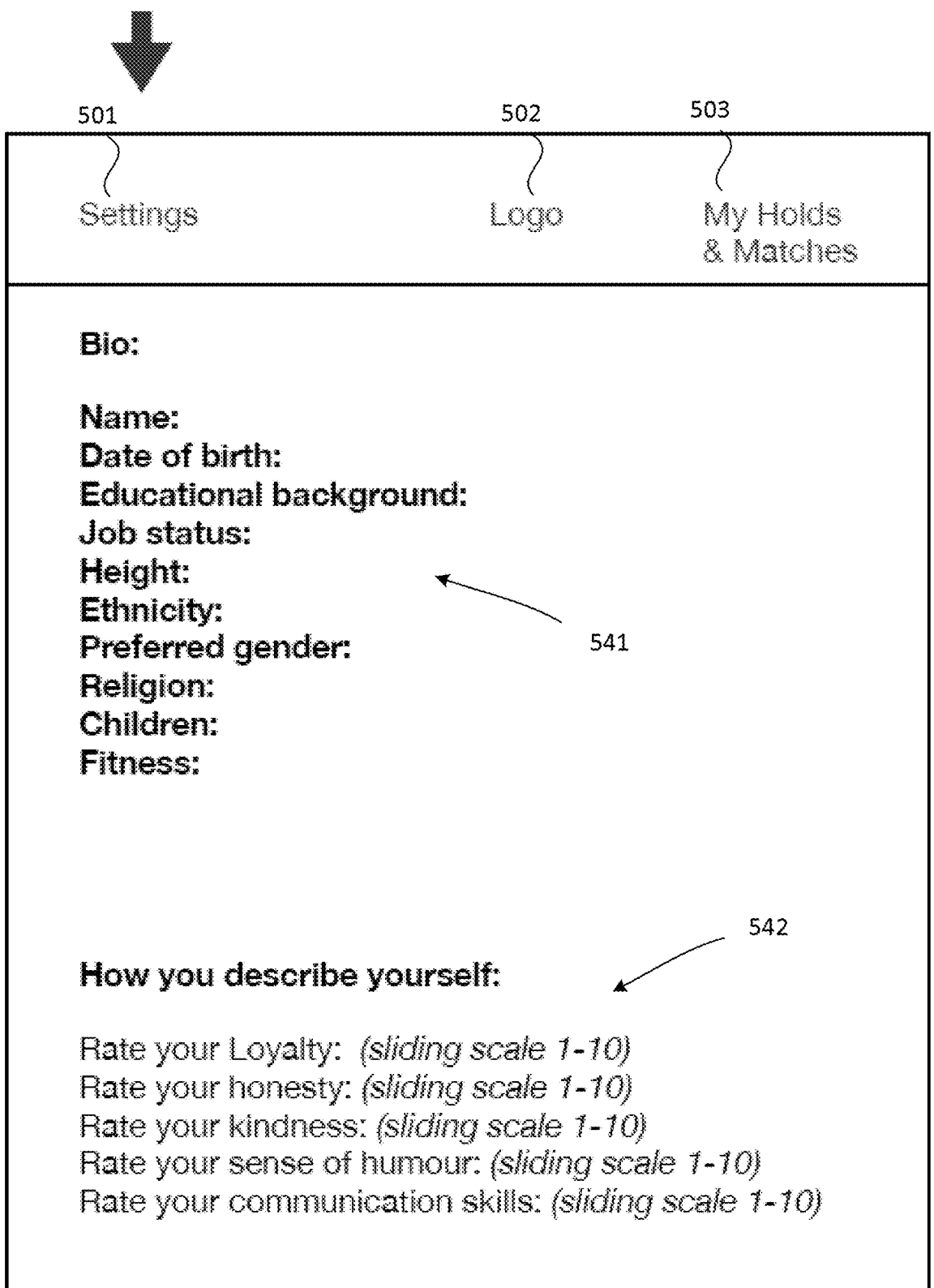
Figure 5G:
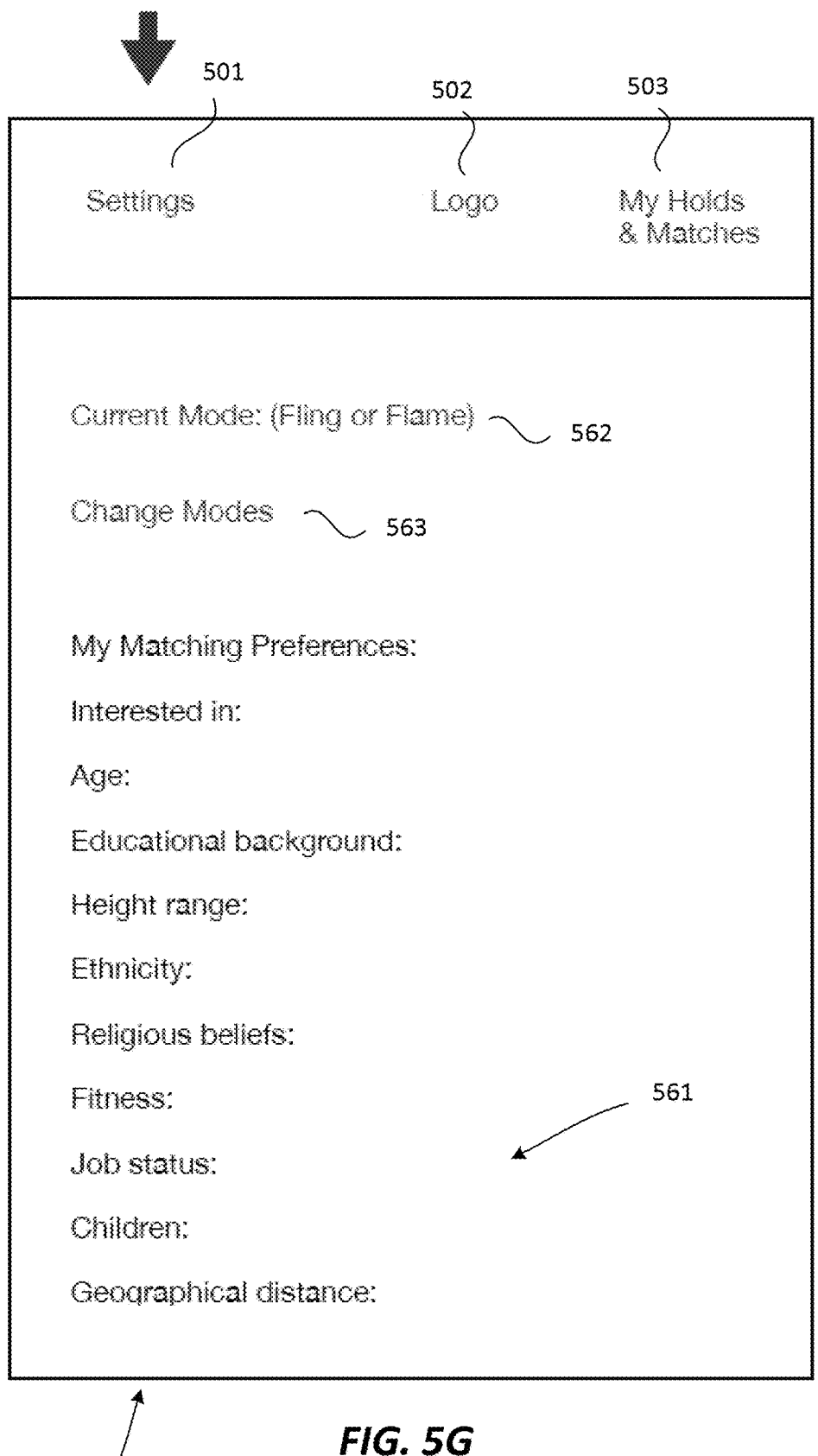
Figure 5H:
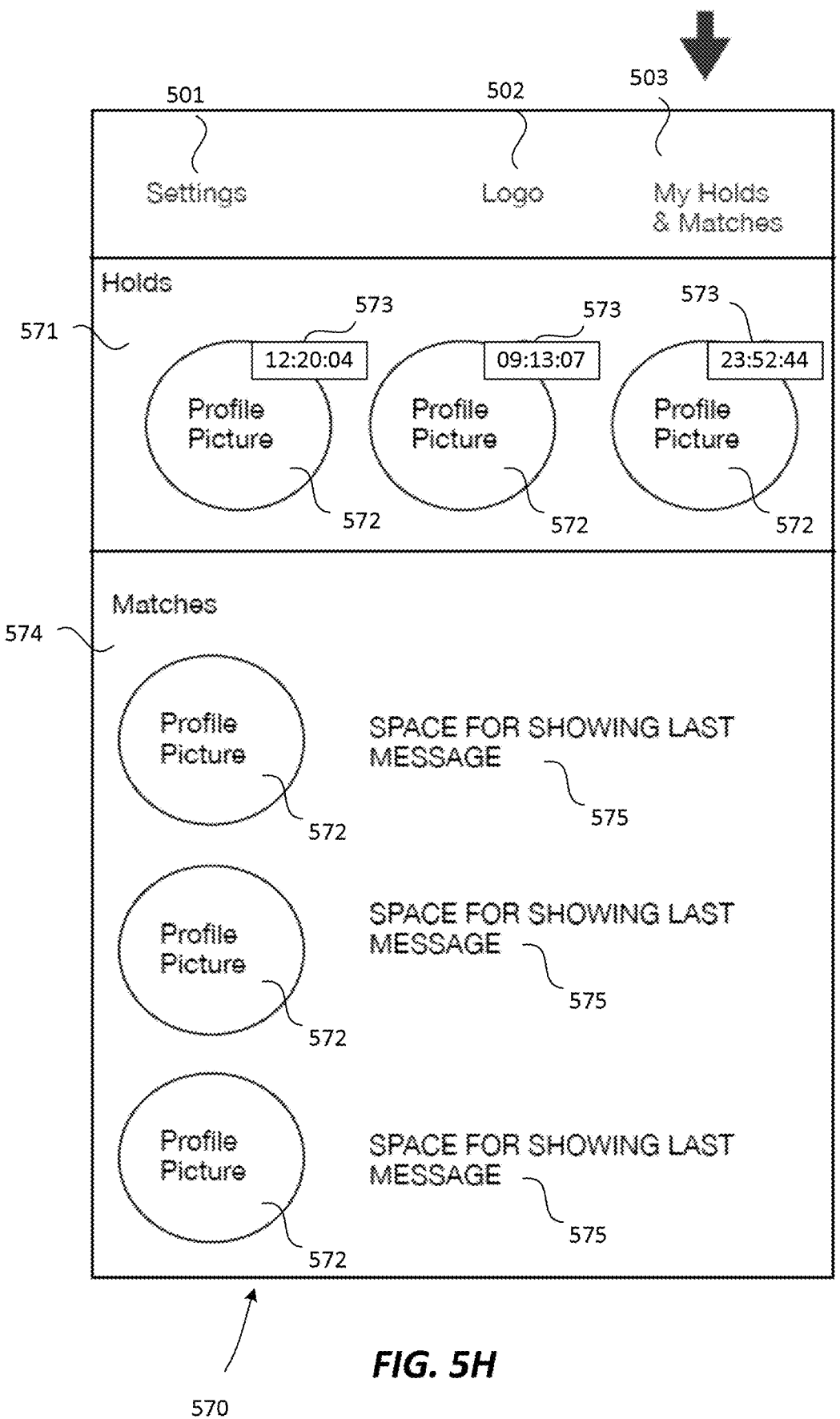

At the top of each screen depicted in FIGS. 5A through 5J, three links may be presented and consistently visible:

- Settings 501, which provides access to a screen for adjusting user settings and preferences, as shown in FIG. 5B;
- Logo 502, which functions as a user interface element for scrolling to the next profile, and also indicates whether user 100 is currently in "fling" or "flame" mode; and
- My Holds & Matches 503, which provides access to user's 100 currently designated holds (i.e., held profiles or "maybes") and matches, as shown in FIG. 5H.

In at least one embodiment, fling or flame mode may also be indicated by a distinctive color that is used as a border around profile pictures 504; a different color may be used for each mode.

Referring now to FIG. 5A, there is shown an example of a screen 500 for presenting user 100 with a profile of a potential match, according to one embodiment. In the center, picture (image) 504 of the potential match may be shown. At top left, individual's name 505 and age 506, along with indicator 507 as to whether the profile has been verified by a third party or is self-verified, may be shown. At top right, indicator 508 (shown in FIG. 5A as the letter H) may be shown, indicating that the profile is currently held (i.e., has been designated as a "maybe"), as described in the above-referenced related application.

Bar 509A may also be shown, including user-selected matching preferences about the profile. Below that may be presented additional information 509B about the individual represented by the profile, including, for example, hobbies, interests, and a free response portion.

In at least one embodiment, scrolling down may cause additional pictures uploaded by the individual to be displayed. Left arrow 509C and hold indicator 508 may be persistent when these additional pictures are shown, and may remain activatable.

In at least one embodiment, left arrow 509C may activate a "slide back" feature that allows user 100 to return to a previously viewed profile.

Button 509D may dismiss the currently displayed profile. Text 509E may remind user 100 that additional images of the profile may be available by scrolling down. Button 509F may be used to issue a "like" to the person associated with the currently displayed profile.

Referring now to FIG. 5B, there is shown an example of a settings screen 510. In at least one embodiment, settings screen 510 may include three sections: my information section 511, my matching preferences section 512, and about/delete section 513.

My Information section 511: In at least one embodiment, section 511 may provide access to functionality allowing user 100 to upload, view, and/or change profile pictures, and may provide a description of hobbies and/or interests. If user 100 has chosen self-verification, they may access and change their own biographical and personality information. However, if user 100 has chosen third-party verification, the system may prevent user 100 from changing such information, but may allow user 100 to see it, along with the name and email address/number of their chosen third-party verifier. User 100 may also either resend the questions for the third-party verifier to redo, or designate a new third-party verifier.

Referring also to FIG. 5D, there is shown an example of a portion of screen 530 for My Information section 511. Screen 530 may include main profile image 531 depicting user 100, along with any number of additional images 532. About me section 533 may allow user 100 to describe their hobbies and/or interests, for example as freeform text. Additional information, images, and/or text (not shown) may also be included.

Referring also to FIG. 5E, there is shown an example of a portion of screen 540 for viewing and/or editing biographical information 541 and/or personality information 542, if user 100 has chosen self-verification.

Referring also to FIG. 5F, there is shown an example of a portion of a screen 550 for a third-party verification option. Here, user 100 may view biographical information 541 and/or personality information 542 provided by a third-party verifier. Screen 550 may also include identifying information about the third-party verifier 551, along with options for resending questions to the third-party verifier 552 and/or designating a new third-party verifier 553.

My Matching Preferences section 512: Here, user 100 may change their matching preferences, including fling or flame mode and/or other options.

Referring also to FIG. 5G, there is shown an example of a portion of a screen 560 for presenting a My Matching Preferences section 561, which may include the user's 100 preferences for matches. Screen 560 may also include an indicator 562 of the current mode (fling or flame) and an option 563 to switch between modes.

About/Delete section 513: In at least one embodiment, section 513 may provide access to information about the app version, trademarks, IP protection (legal), and/or the like. In addition, a delete option may be provided. Referring also to FIG. 5C, there is shown an example of a screen 520 for providing such information and options.

Referring now to FIG. 5H, there is shown an example of a My Holds and Matches screen 570. As described in the above-referenced related application, holds represent profiles that user 100 has designated as "maybe". Holds section 571 may include any number of holds, with a profile picture 572 being shown for each; user 100 may tap on a profile picture 572 to view the corresponding profile. In at least one embodiment, an indicator 573 may be displayed adjacent to each held profile, showing the time remaining before that hold expires.

Matches represent profiles with whom user 100 is currently actively matched, and with whom user 100 may be having a conversation. Matches section 574 may include any number of matches, with a profile picture 572 being shown for each; user 100 may tap on a profile picture 572 to view the corresponding profile. Adjacent to each profile 572 in matches section 574 is the most recent message 575 of the conversation with the individual represented by the profile. User 100 may tap on profile picture 572 or most recent message 575 to cause a messaging screen to be displayed, allowing for access to more details of an ongoing communication with that individual.

Figure 5I:
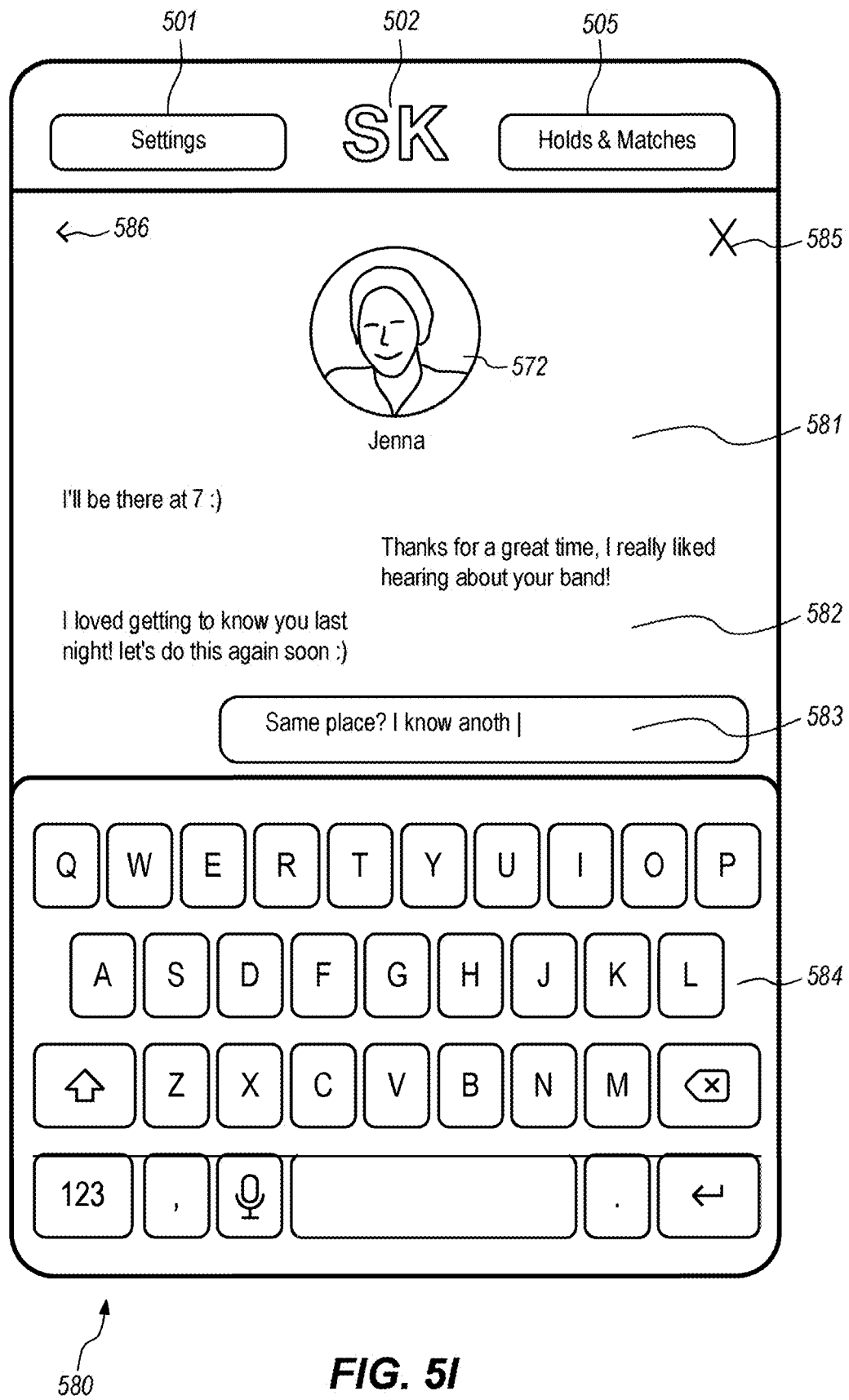

Referring now to FIG. 5I, there is shown an example of message screen 580 that may be displayed in response to user 100 tapping on profile picture 572 or most recent message 575 in matches section 574. Message screen 580 may include profile picture 572, along with a space 581 in which a conversation 582 between user 100 and the individual represented by profile picture 572, including messages and/or the like. Message screen 580 may include on-screen tools for composing new messages, such as on-screen keyboard 584 for entering text in message field 583, in a manner that is well known for messaging using mobile devices and/or similar devices. In at least one embodiment, message screen 580 may also include a button 585 to "unmatch" the individual with whom user 100 is communicating. As described above, this may terminate the conversation; in at least one embodiment, a confirmation prompt and/or warning may first be displayed. Return arrow 586 returns to a previous screen.

Figure 5J:
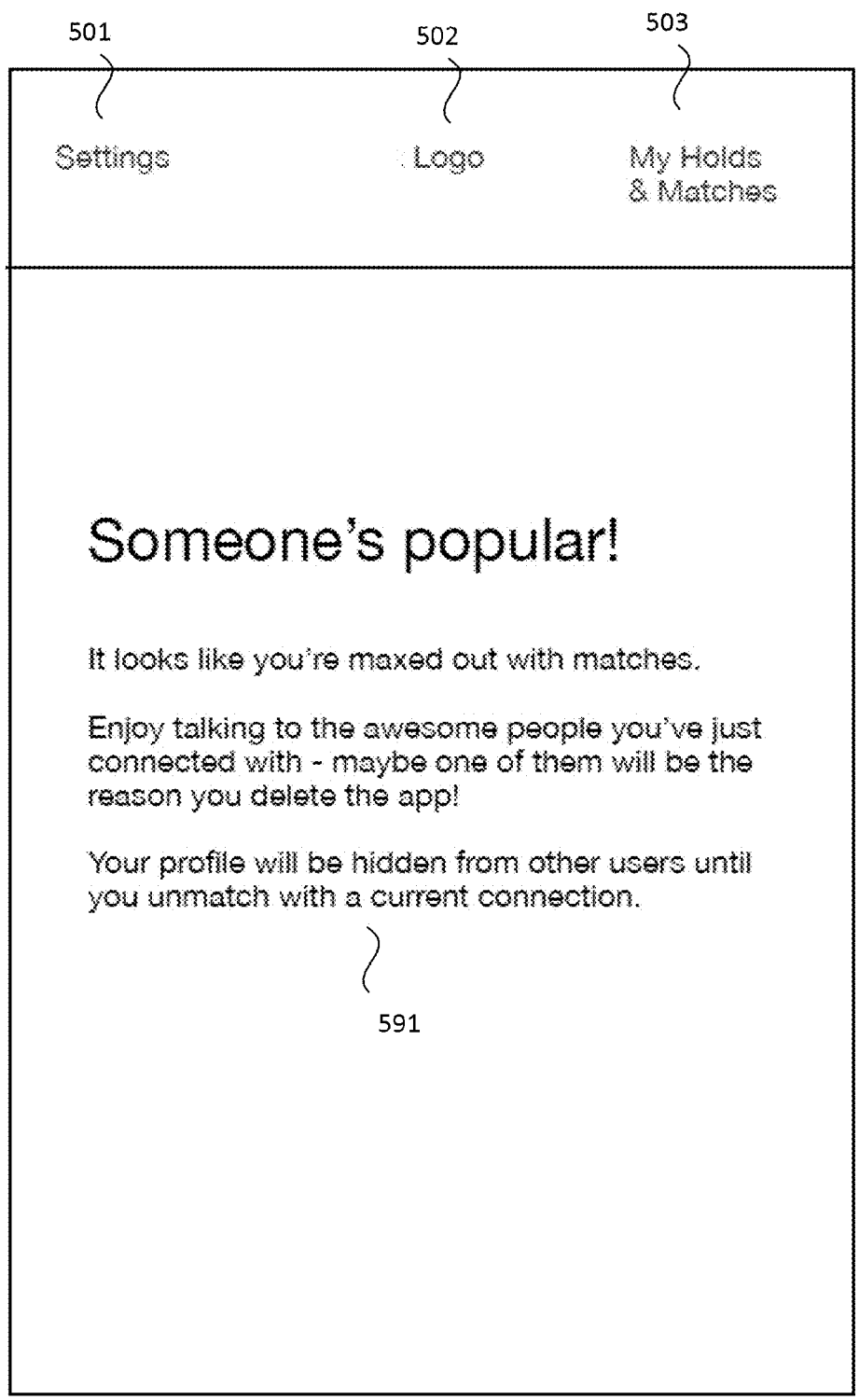

Referring now to FIG. 5J, there is shown an example of a screen 590 that may be displayed when a user reaches the match limit. As described above, this condition is referred to as "saturation." A message, such as message 591, may be displayed to remind user 100 that their profile will be hidden from other users until they unmatch at least one profile so that they are once again below the match limit.

In at least one embodiment, whenever user 100 receives a match, a notification may be presented on their device. User 100 may then tap My Holds and Matches 503 to start communicating with the individual with whom they have been matched.

Match Limits

In at least one embodiment, an algorithm may be performed to automatically apply a limit to the number of matches (also referred to as "strong connections") a user 100 may have at any given time.

More generally, match limits may be applied to impose a maximum number of connections of a given type between private collections of nodes in a networked system. Thus, the description here, which presents the match limit algorithm in the context of a dating application wherein the nodes correspond to users, is merely intended as an example for illustrative purposes. In other contexts, nodes may refer to any other entities and may be not limited to users of a dating application. In addition, connections may refer to any type of relationship that may be established between or among nodes, and may not be limited to matches or strong connections.

In the description provided herein, matches may be established between pairs of nodes, so that a connection involves two nodes. In other embodiments, however, matches may be established among any number of nodes.

Furthermore, in the description provided herein, a match between nodes enables and initiates a "conversation" between the nodes, for example via messaging functionality within a software application ("app") or website. The conversation may include a series of communications between the nodes. In at least one embodiment, the conversation may automatically terminate if the nodes are unmatched with one another.

Figure 6A:
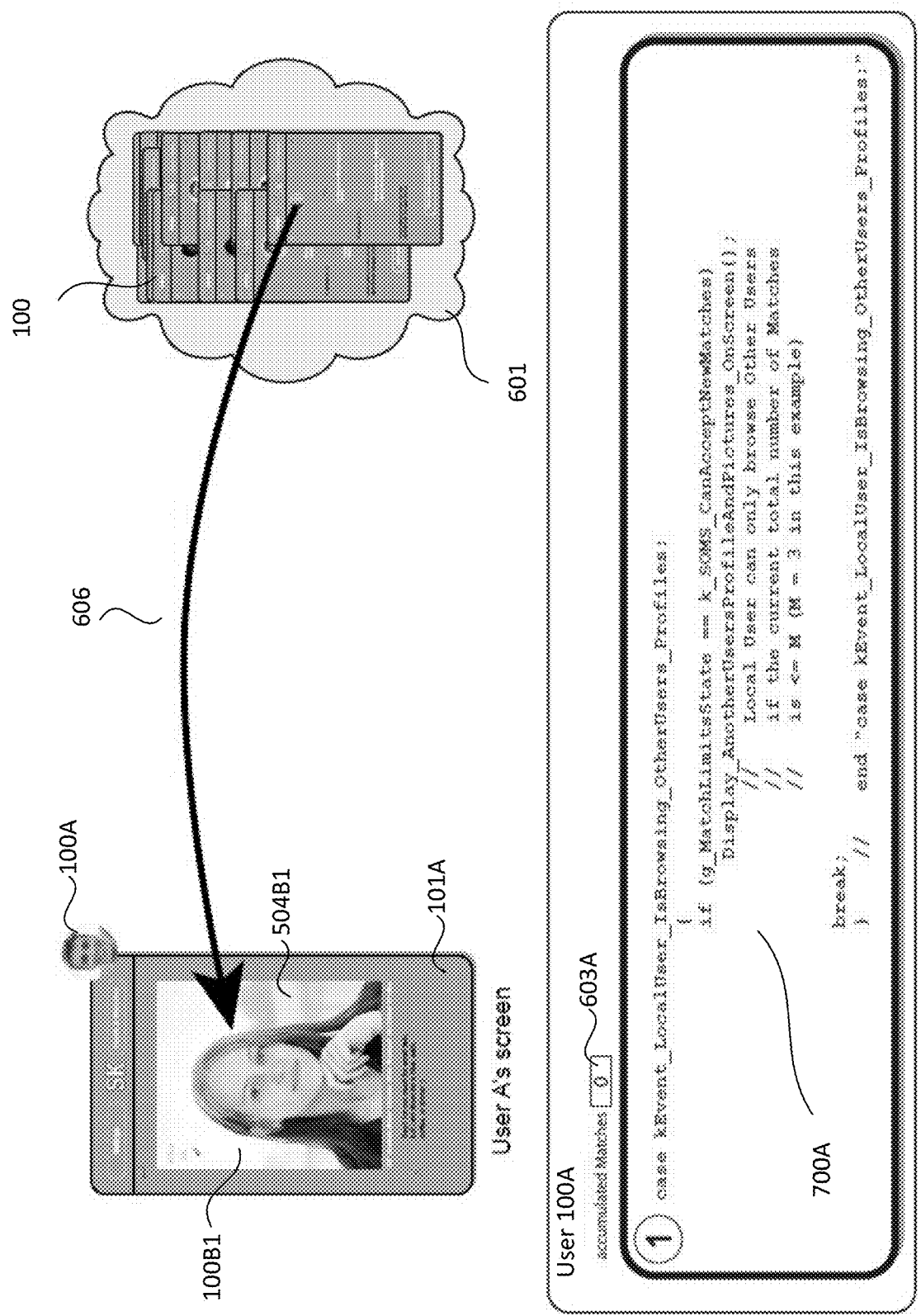
FIGS. 6A through 6N depict examples of application of a technique for applying match limits in the context of a dating application, according to one embodiment.
Figure 6B:
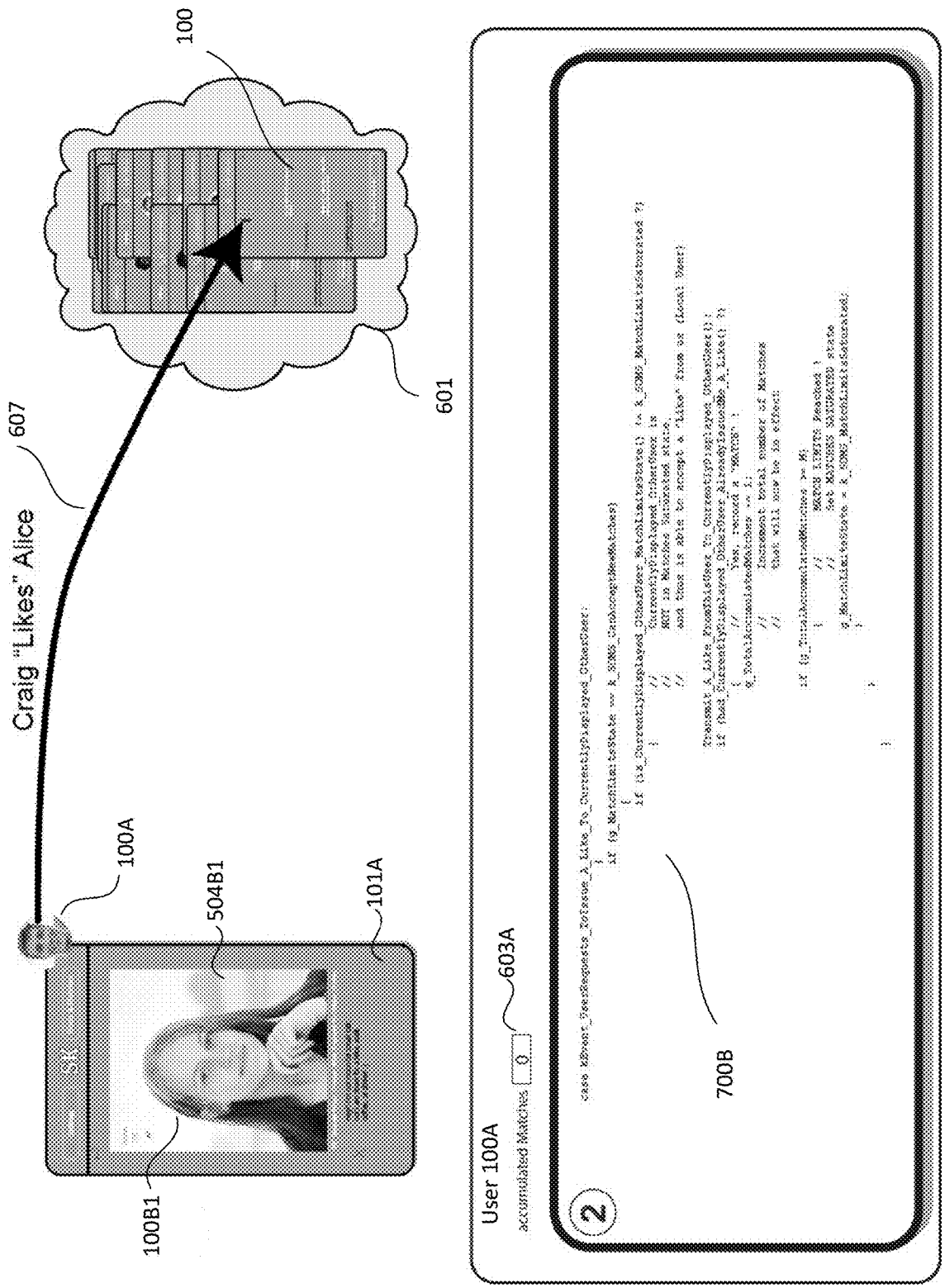
Figure 6C:
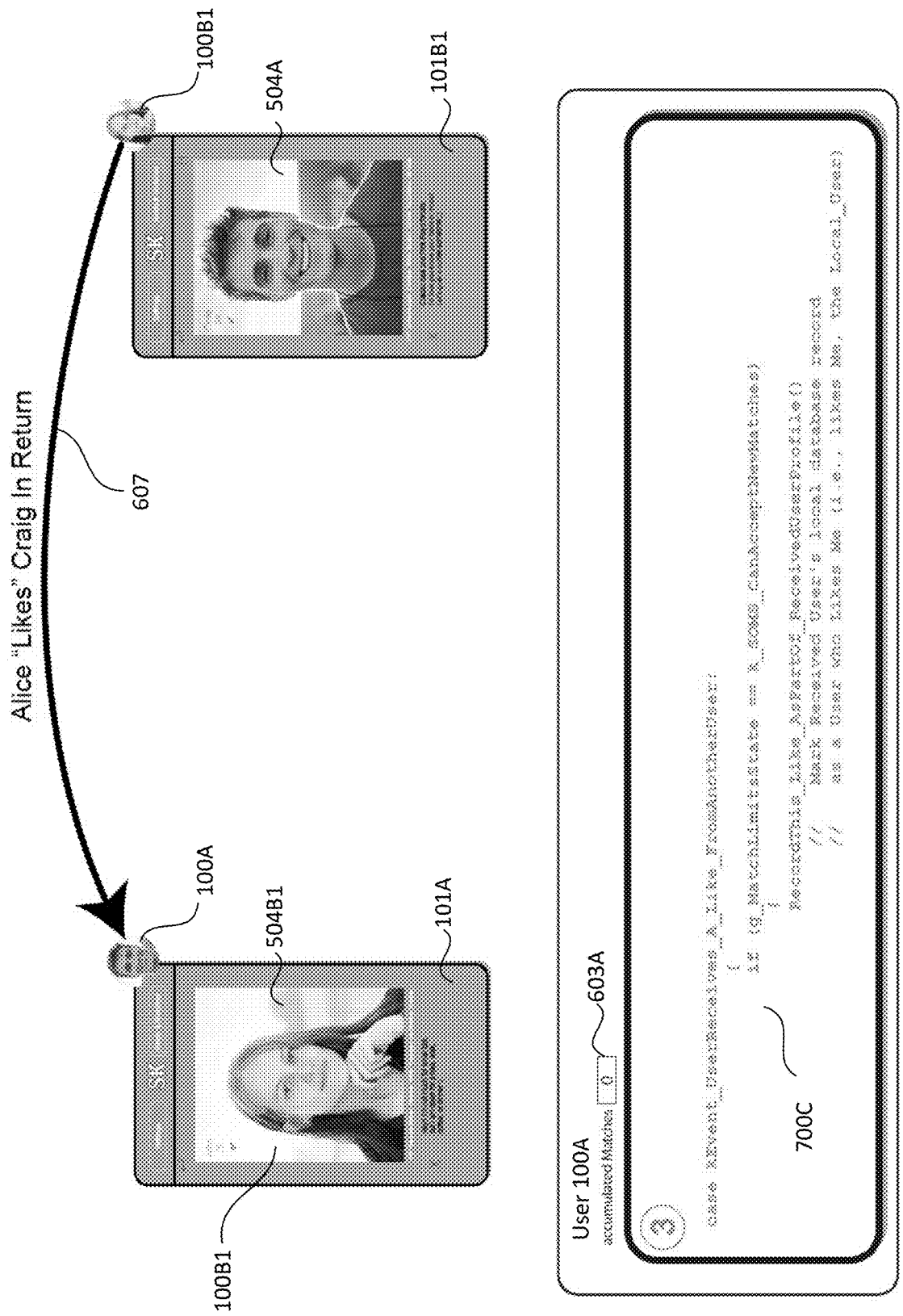
Figure 6D:
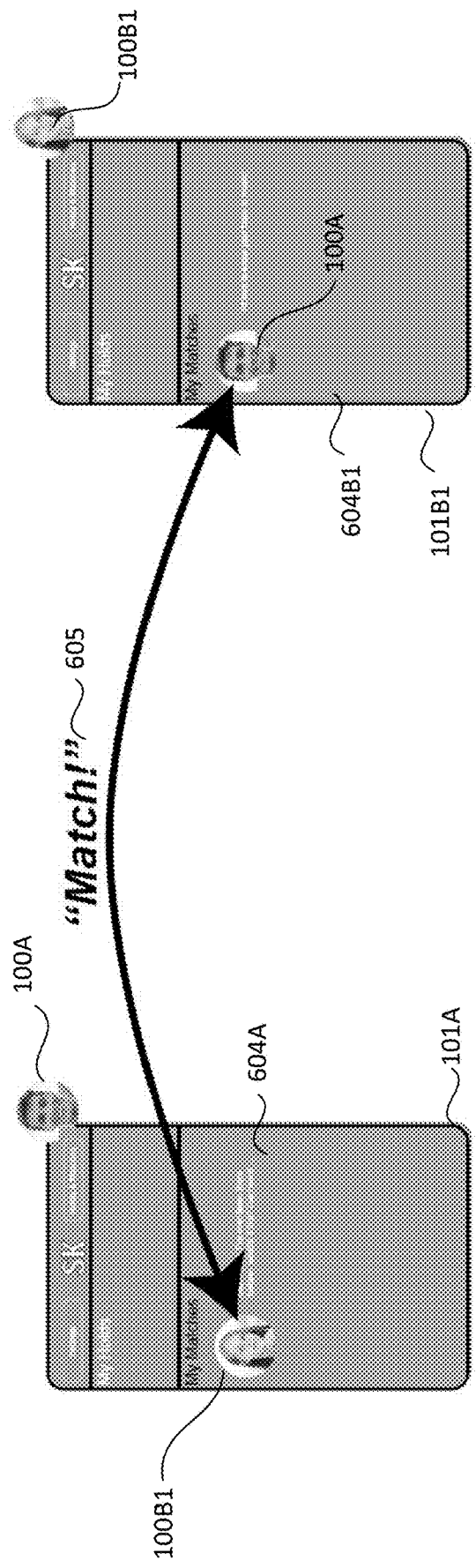
Figure 6D:
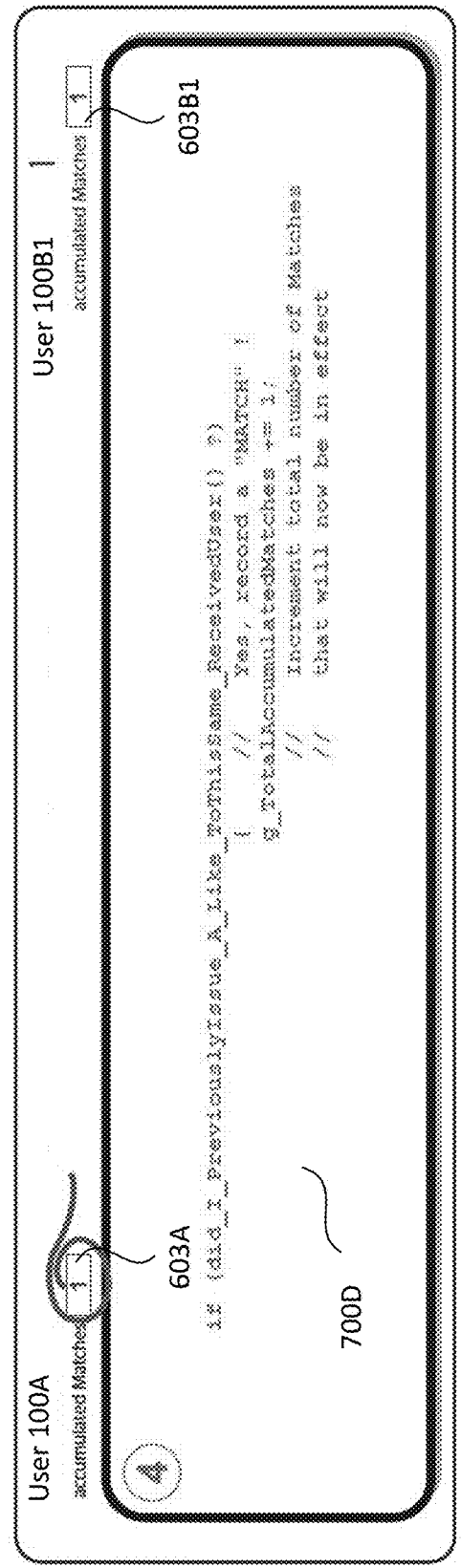
Figure 6E:
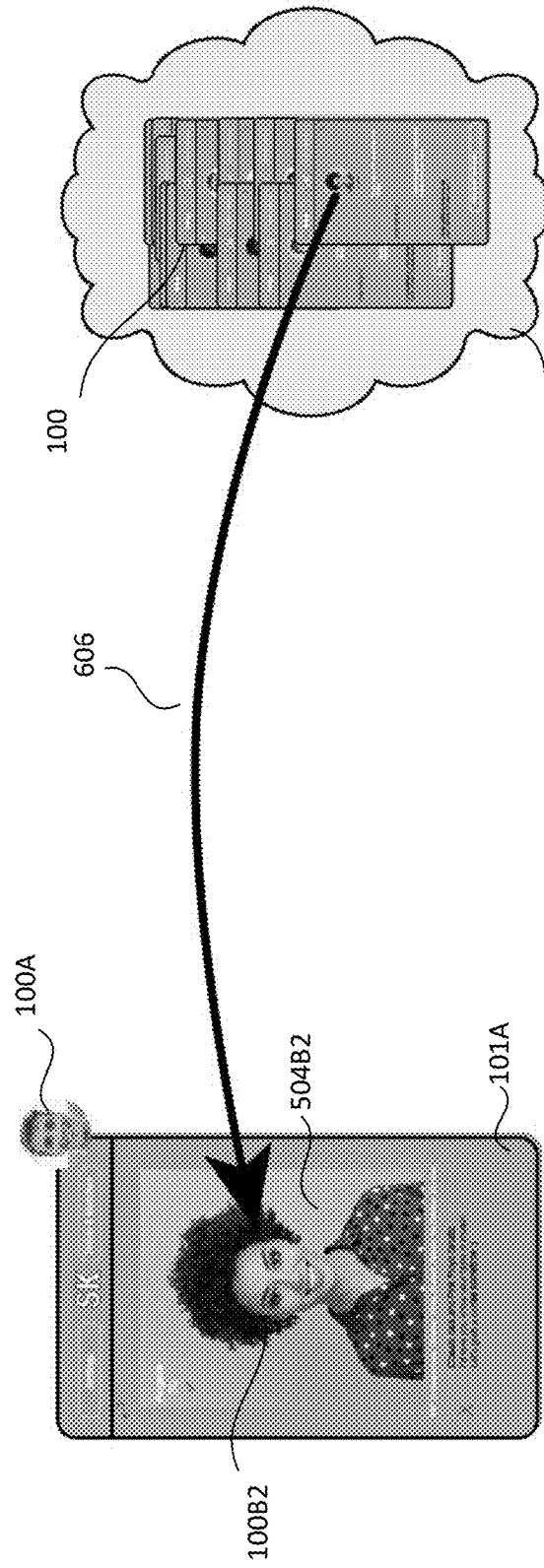
Figure 6F:
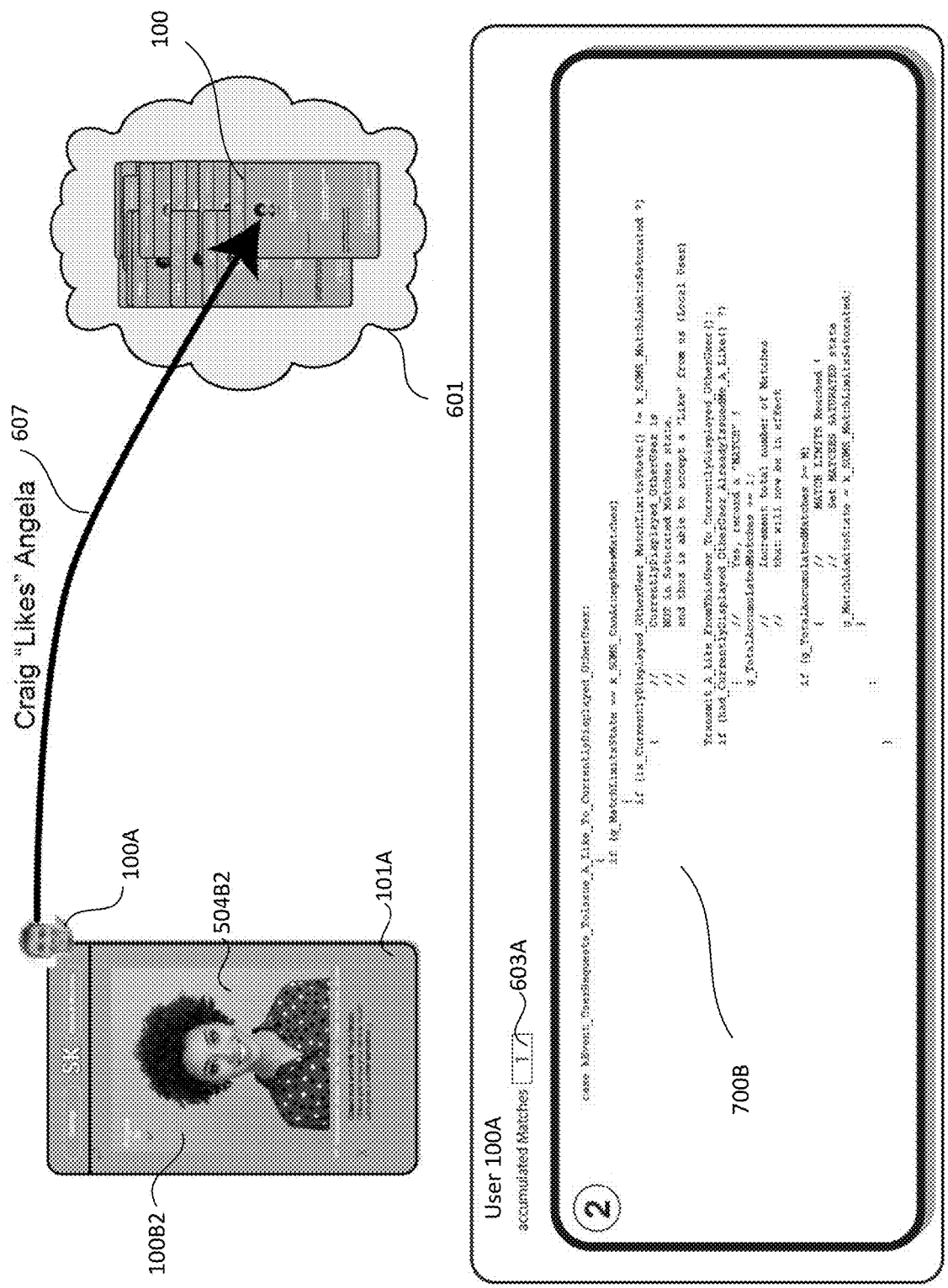
Figure 6G:
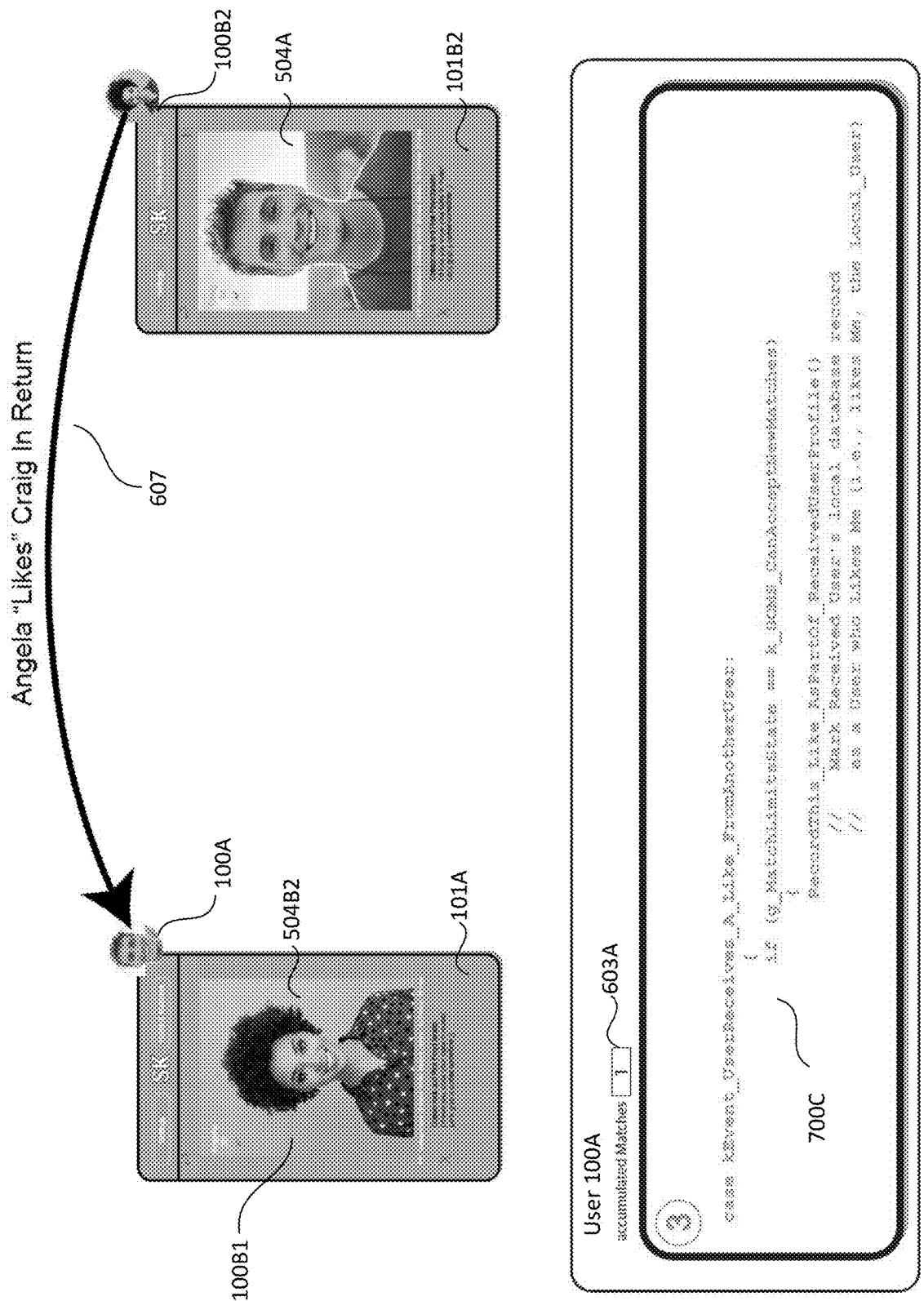
Figure 6H:
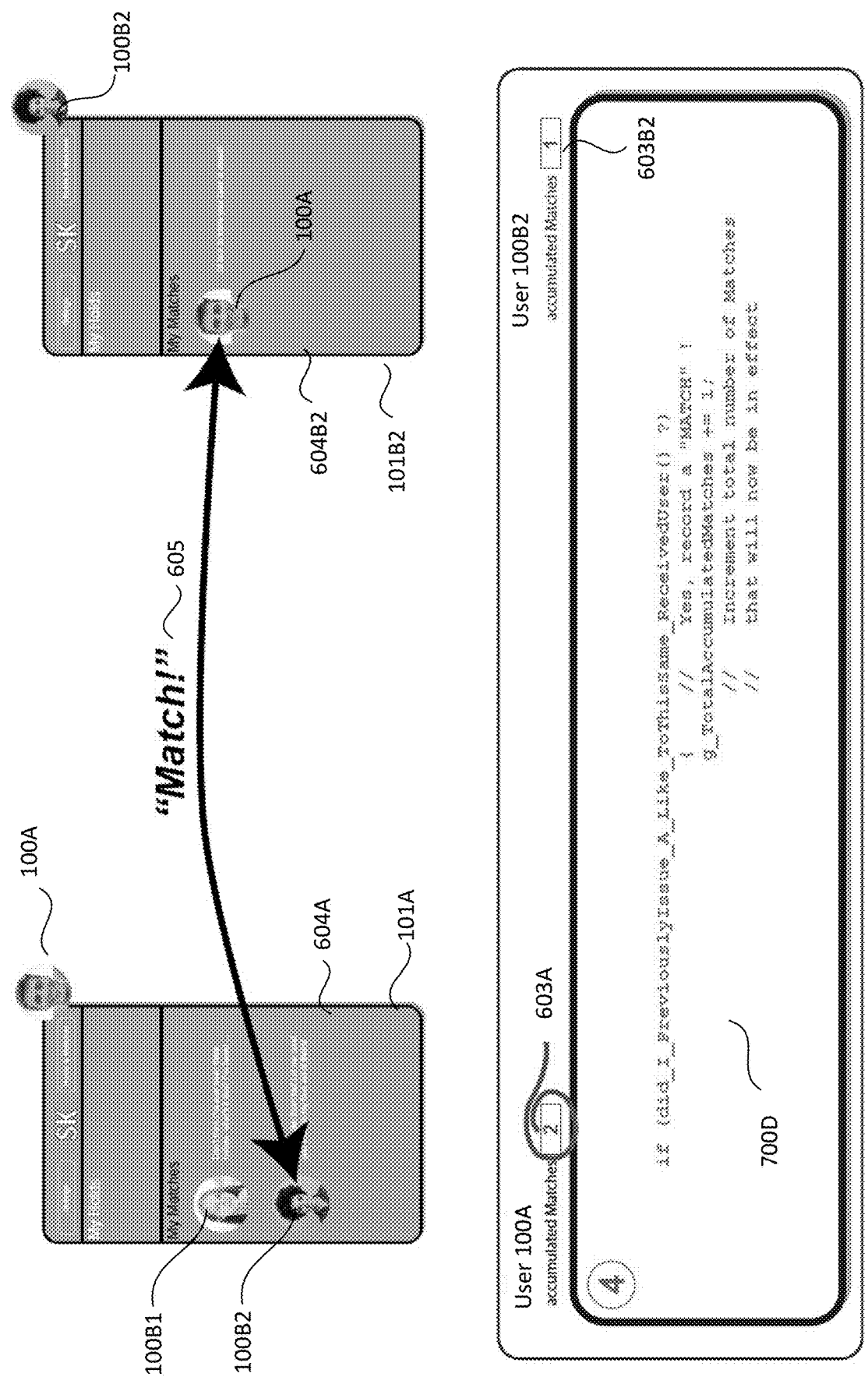
Figure 6I:
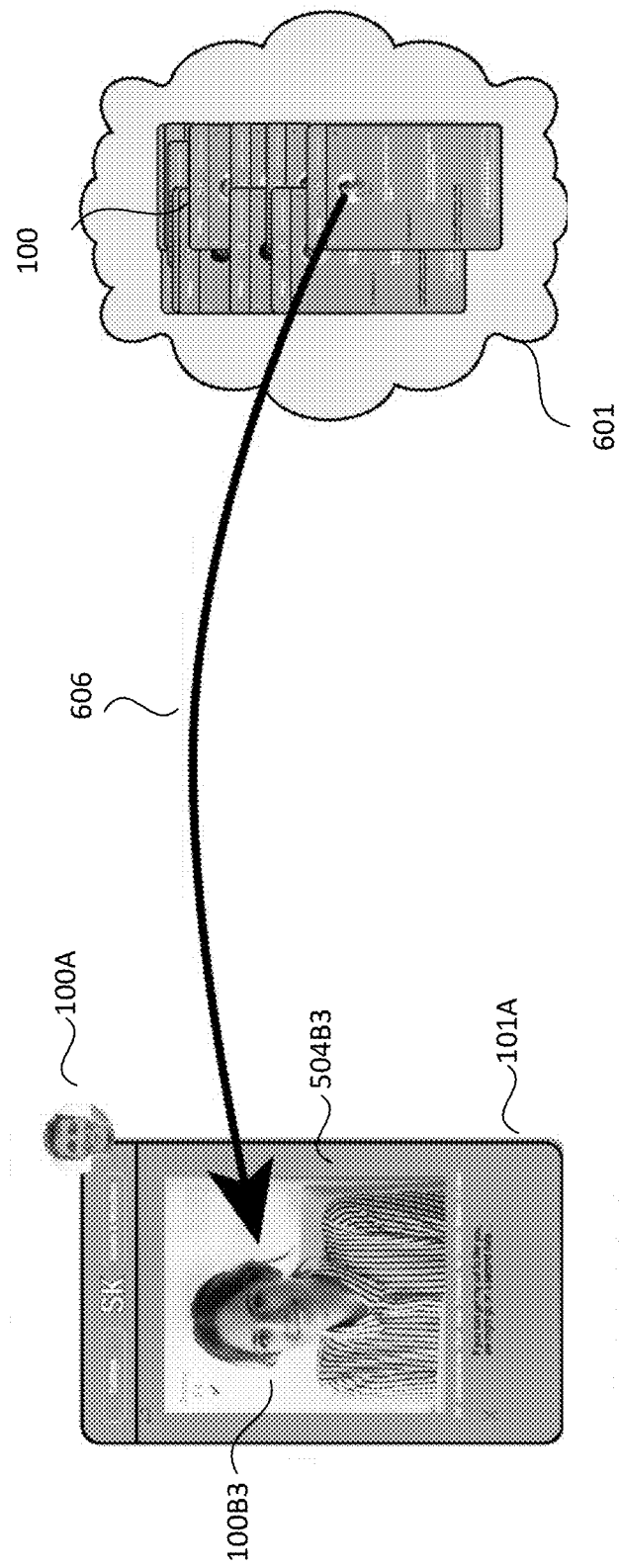
Figure 6J:
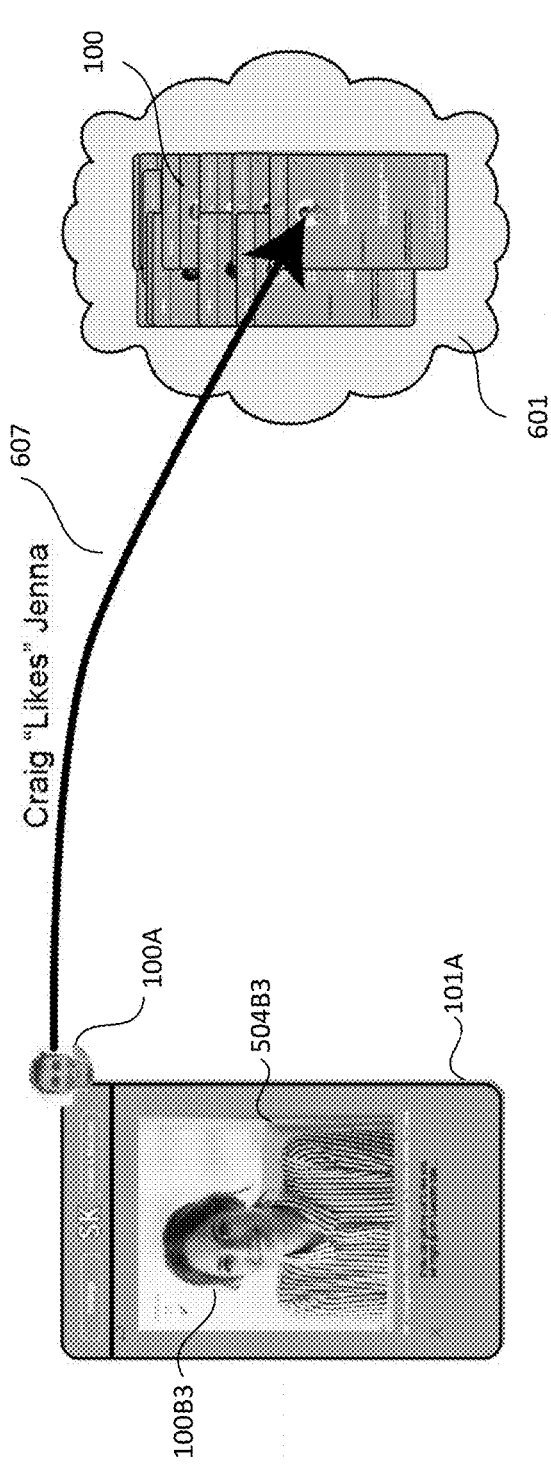
Figure 6J:
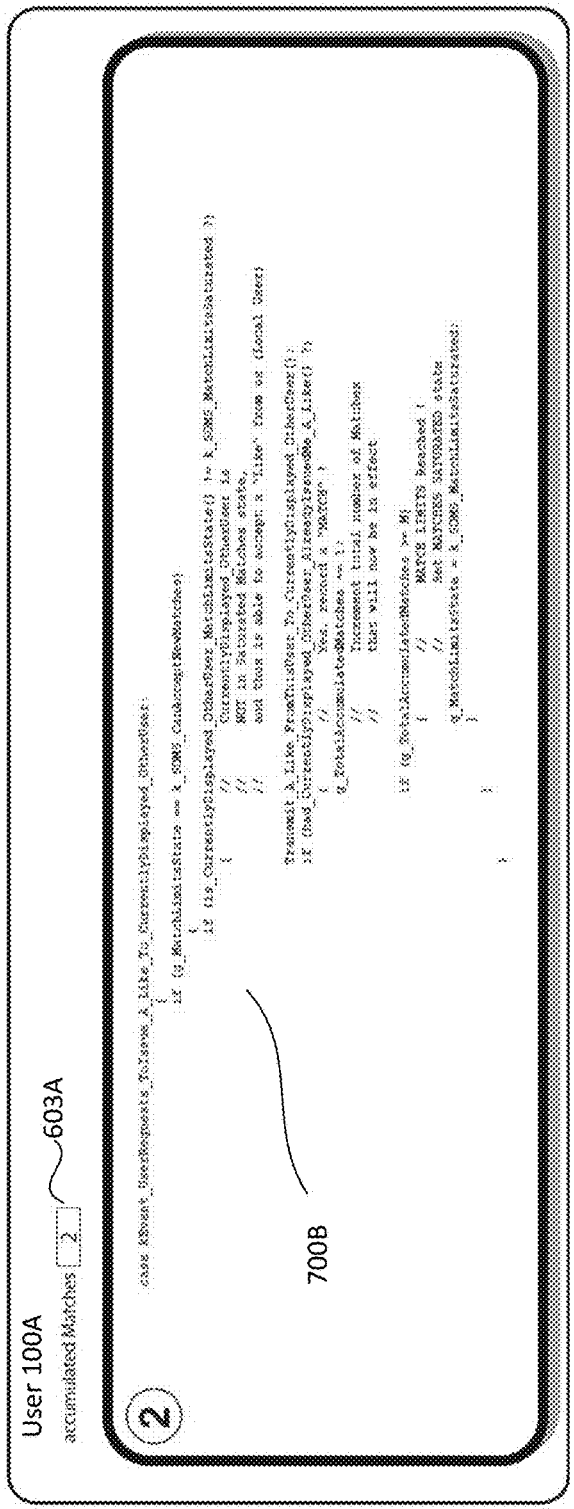
Figure 6K:
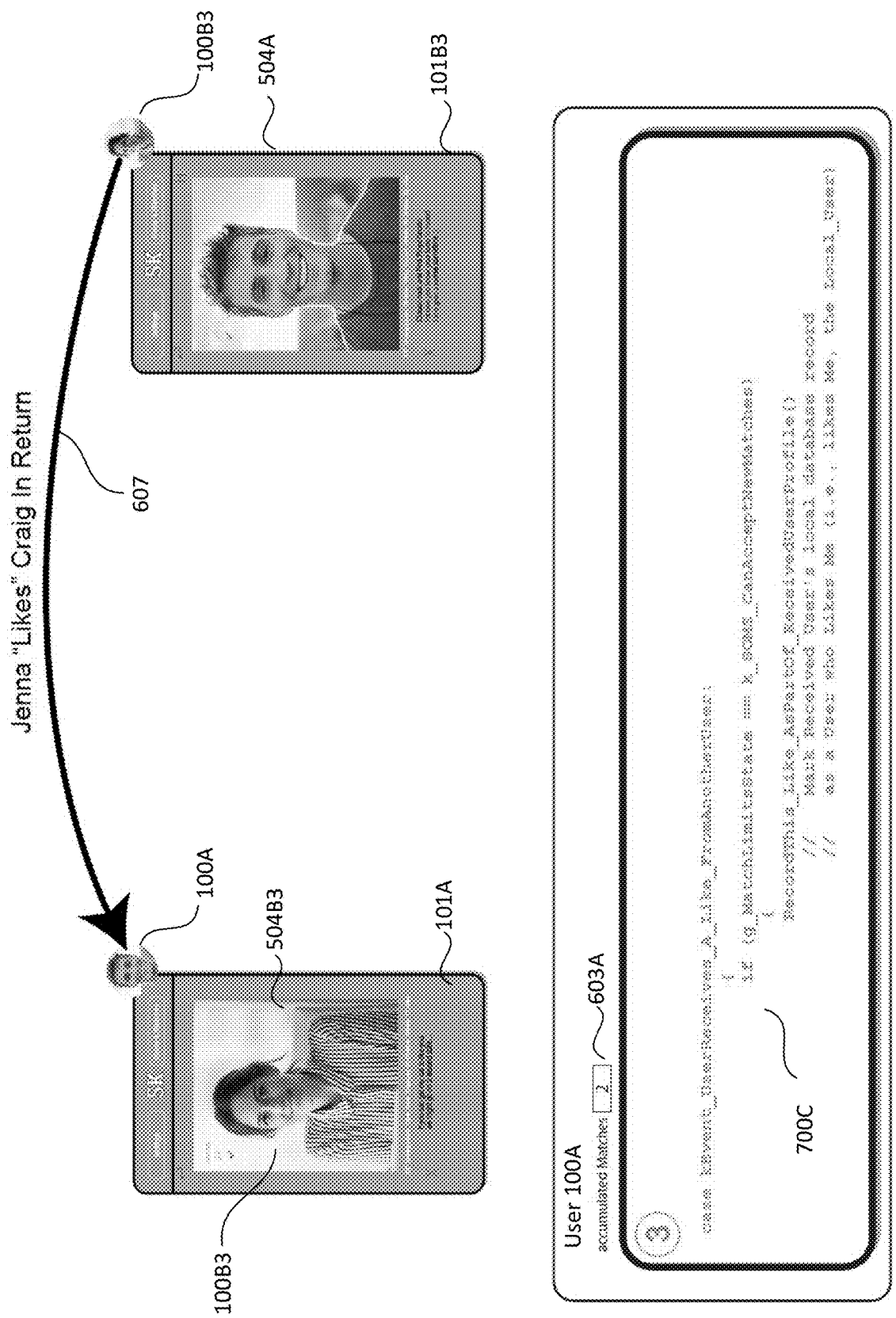
Figure 6L:
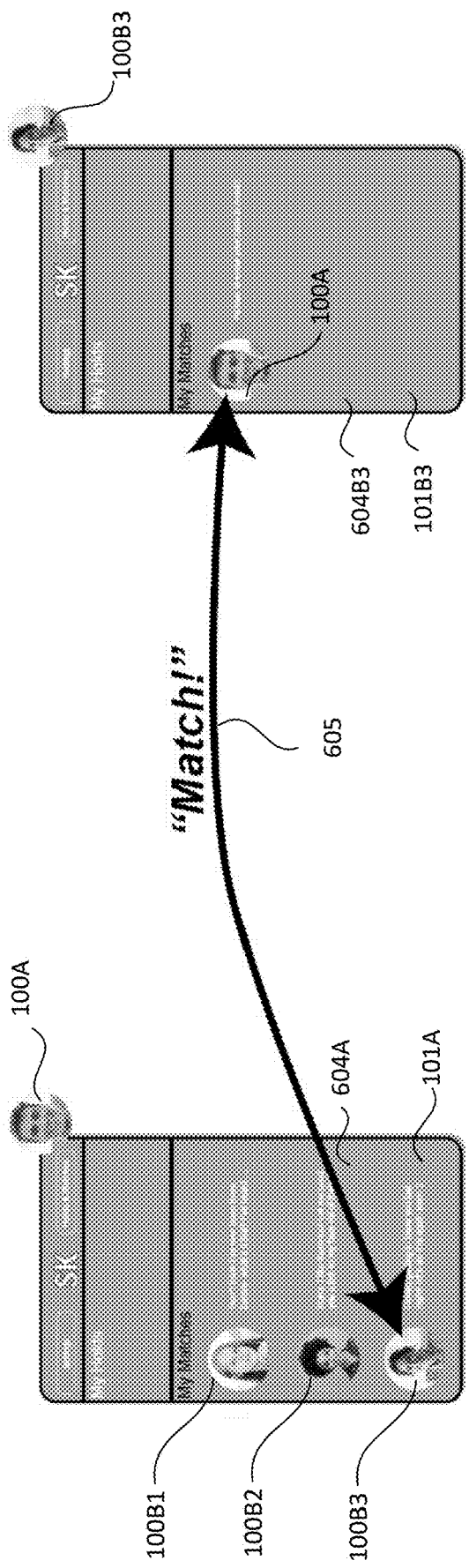
Figure 6L:
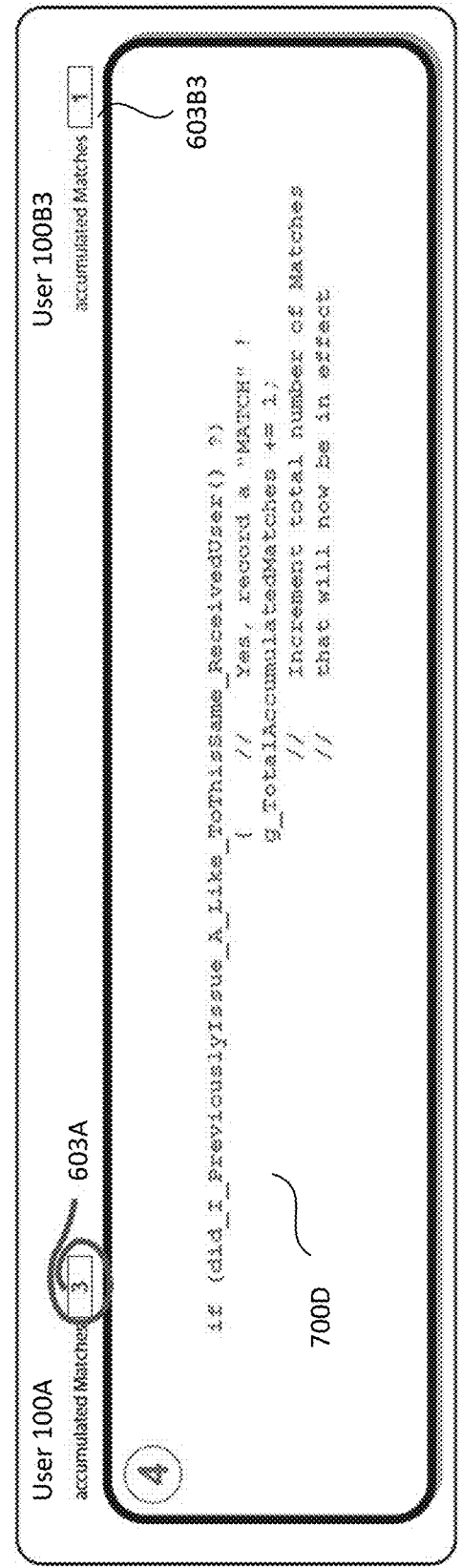
Figure 6M:
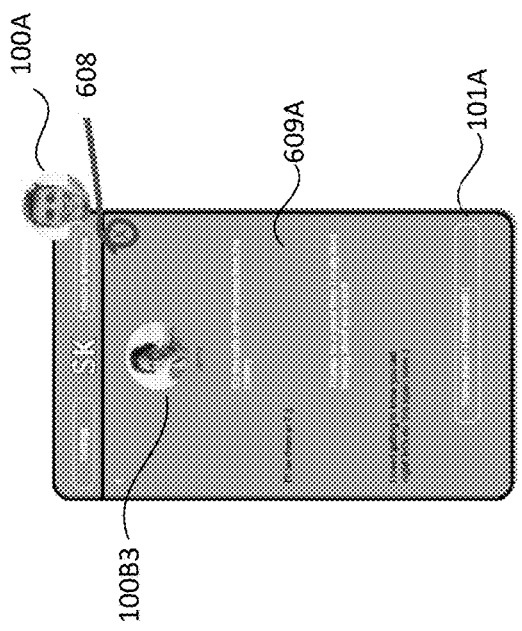
Figure 6M:
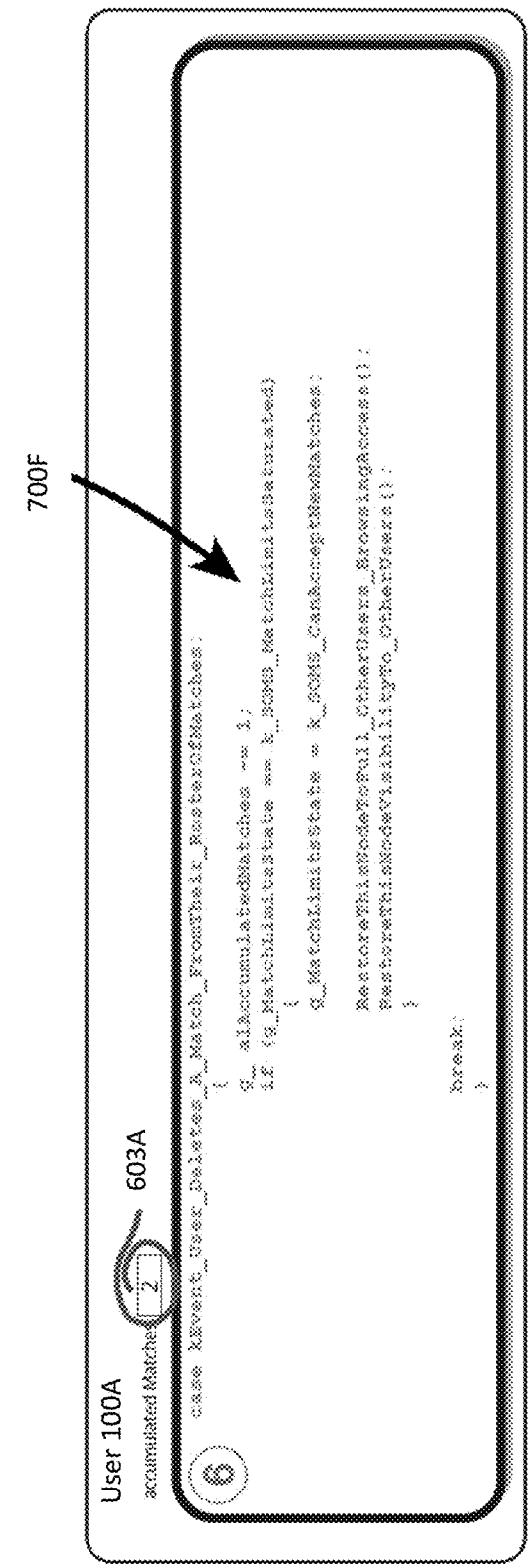
Figure 6N:
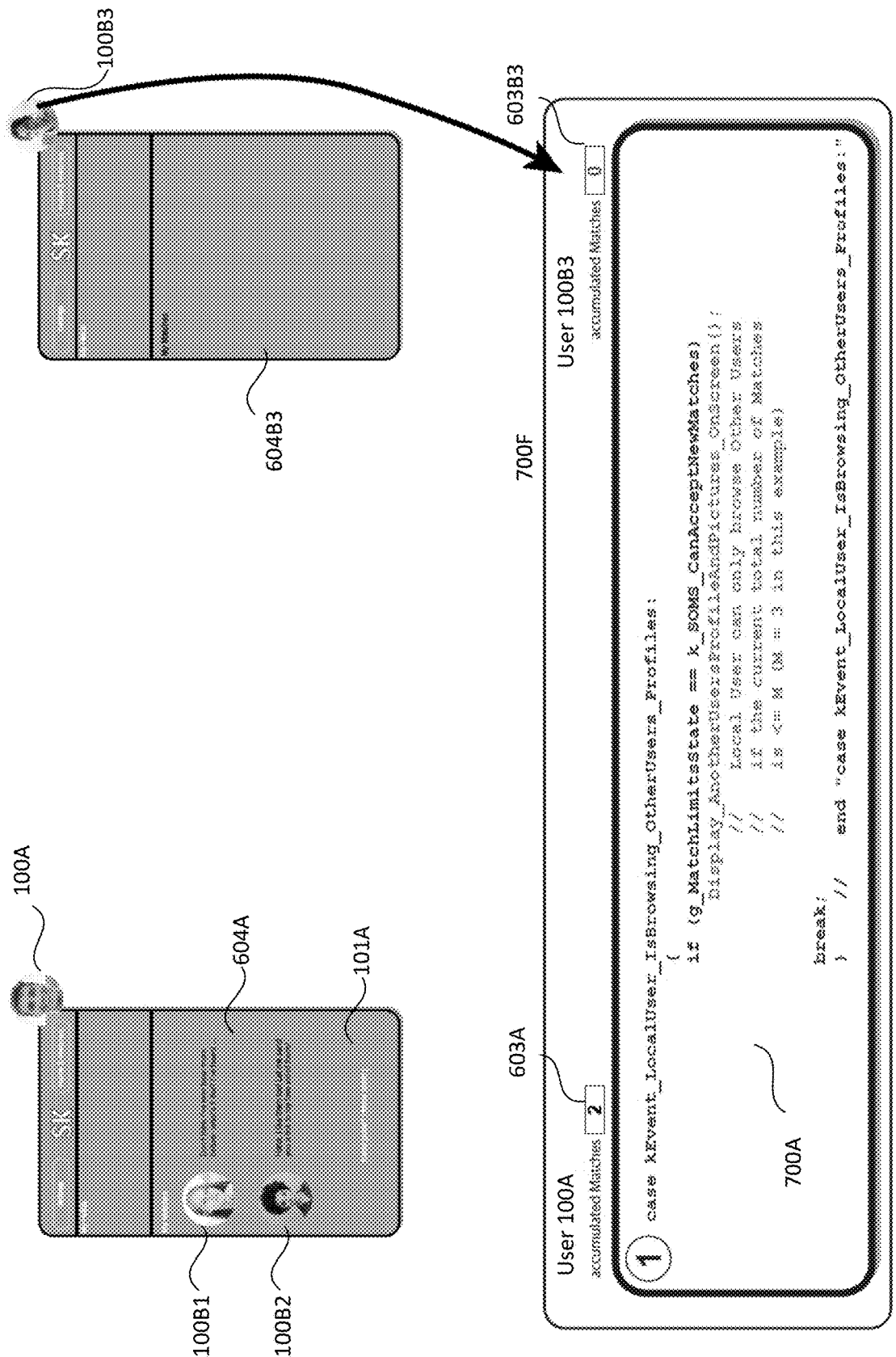
Figure 7C:
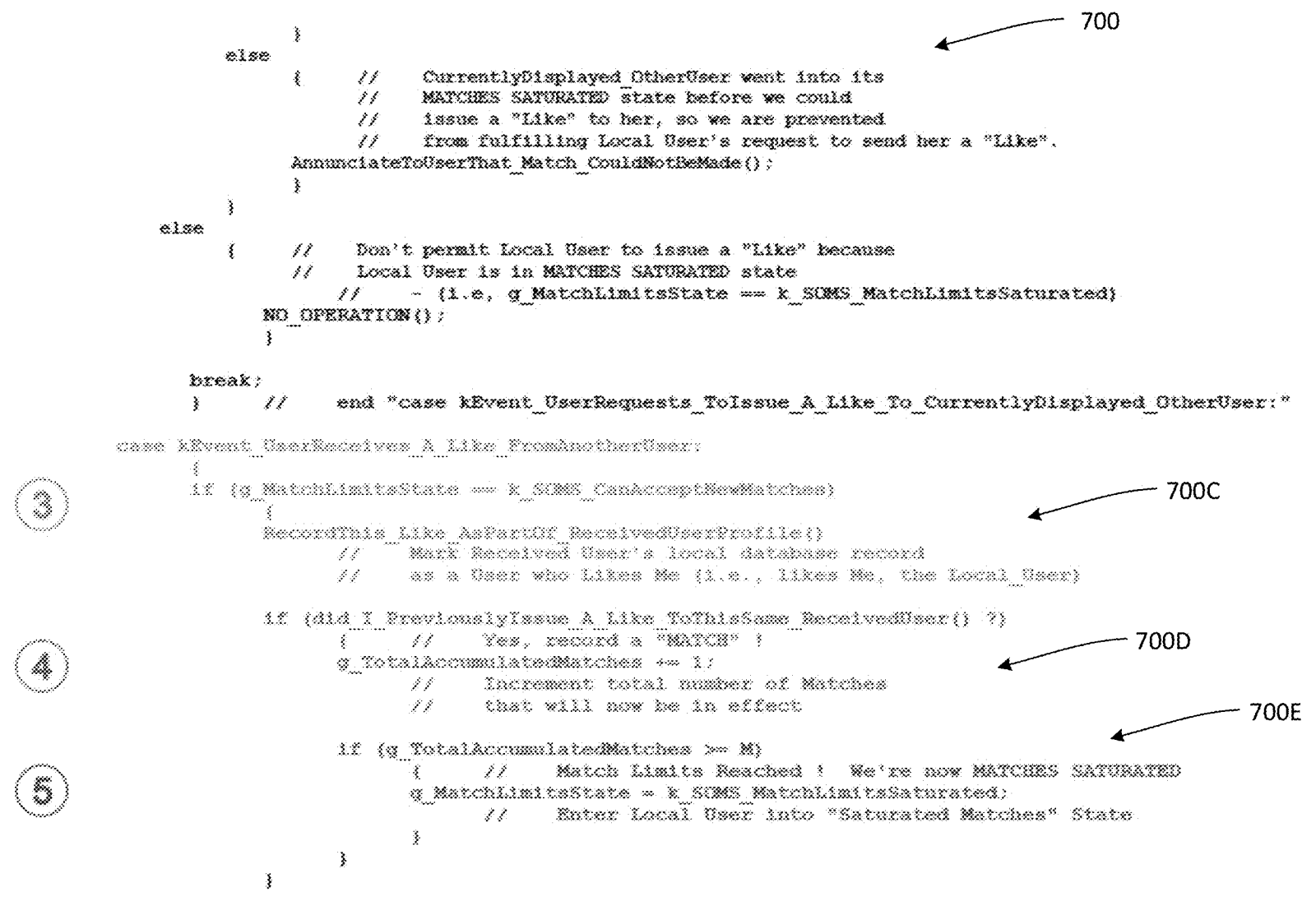
Figure 7D:
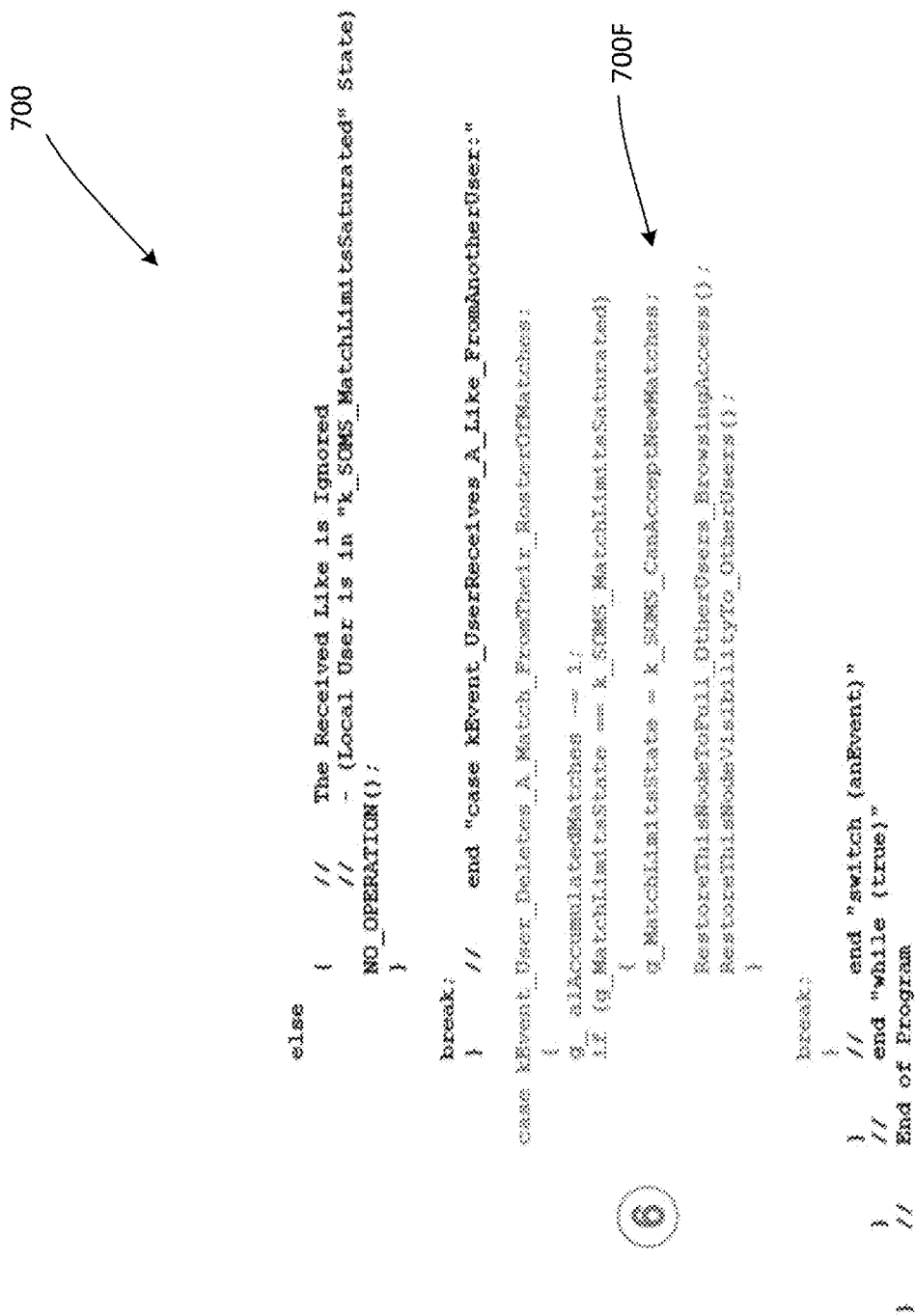

The description will be set forth in the context of an illustrative example, as depicted in FIGS. 6A through 6N, showing the use of a technique for applying match limits in the context of a dating application, according to one embodiment. Referring also to FIGS. 7A through 7D, there is shown an example of pseudocode 700 that can be used to implement the techniques described herein, according to one embodiment. For illustrative purposes, pseudocode 700 is depicted in a C++ like programming language, including fundamental variable types 'int' and 'enum', and with the use of the '#define', 'if', 'switch' and 'enum' statements common to both C and C++ languages. Various excerpts 700A through 700F from pseudocode 700 are also included in FIGS. 6A through 6N.

For purposes of the example, the system is assumed to operate in the context of a dating application that may be used to establish matches among users. A first user 100A may be a heterosexual man named Craig. He is online using his dating app, looking for potential female dating prospects, and hoping to establish free and open conversations via messaging functionality with several women whom he sees via the app and finds appealing. User 100A visits the cloud of users and issues a "like" to each of several female users 100B1 (Alice), 100B2 (Angela), and 100B3 (Jenna). Each of the female users 100B1, 100B2, 100B3 respond with a "like" in return, causing a match to be established in each of the three cases.

As described herein, if any user 100 accumulates a number of matches that equals or exceeds the match limit (3 in this example), then that user 100 becomes "saturated" (i.e., enters matchesSaturated State, as indicated by k_SOMS_MatchLimitsSaturated in pseudocode 700), which prevents that user 100 from browsing or seeing any more prospects from cloud 601 of users 100.

In addition, in at least one embodiment, a saturated user 100 becomes invisible to the entire cloud of other users 100 and thus will not be seen by any other user 100, except for users 100 with whom a match has already been established.

Saturation state is cleared for a saturated user 100 if that user 100 deletes one or more of their matches, or if one or more of their matches deletes them.

Referring now to FIG. 6A, there is shown a first step in the process. Using the dating application, user 100A may browse through cloud 601 of users 100 and view 606 a profile for user 100B1, a woman named Alice. FIG. 6A depicts user's 100A device 101A, including profile picture 504B1 of user 100B1. Additional elements of user's 100B1 profile may also be shown.

As shown in pseudocode excerpt 700A, user 100A may only browse other users if the current total number of matches is less than or equal to a limit M, which in this example is 3. Also shown is a current running total of accumulated matches 603A for user 100A, which is currently zero.

Referring now to FIG. 6B, there is shown a next step in the process. Here, user 100A (Craig) may issue a "like" 607 to user 100B1 (Alice), seeking to obtain a match with user 100B1. As shown in pseudocode excerpt 700B, user 100A may only be able to issue the "like" if he is not currently in a saturated state (i.e., if the accumulated matches for user 100A is below the maximum).

Upon being notified of the "like", user 100B1 may accept the "like", responding with a "like" 607 of user 100A.

Referring also to FIG. 6C, there is shown an example depicting user's 100B1 device 101B1, including profile picture 504A of user 100A. Once user 100B1 accepts the "like" from user 100, a match may be automatically established between users 100A and 100B1, and a conversation may automatically be initiated, for example via a messaging component of the dating app. As shown in pseudocode excerpt 700C, user 100B1 may only be able to accept the "like" if she is not currently in a saturated state (i.e., if the accumulated matches for user 100B1 is below the maximum).

Referring now to FIG. 6D, there is shown a next step in the process, wherein a match 605 is established between users 100A and 101B1. As a result, user 100B1 now appears in My Matches area 604A of user's 100A device 101A, and user 100A now appears in My Matches area 604B1 of user's 100B1 device 101B1. In at least one embodiment, My Matches area 604A may depict all other users with whom user 100A is matched, and may display the most recent message to or from each of the matched users. In at least one embodiment, user 100A can tap on another user within My Matches area 604A to open a messaging component wherein user 100A can exchange messages with the user.

As shown in pseudocode excerpt 700D, accumulated matches 603A for user 100A and accumulated matches 603B1 for user 100B1 may both be incremented by one when match 605 is established.

Referring now to FIG. 6E, there is shown a next step in the process. User 100A may again browse through cloud 601 of users 100 and view 606 a profile for user 100B2, a woman named Angela. FIG. 6E depicts user's 100A device 101A, including profile picture 504B2 of user 100B2. Additional elements of user's 100B2 profile may also be shown.

As shown in pseudocode excerpt 700A, user 100A may only browse other users if the current total number of matches is less than or equal to a limit M, which in this example is three. As shown in FIG. 6E, the current running total of accumulated matches 603A for user 100A is currently one.

Referring now to FIG. 6F, there is shown a next step in the process. Here, user 100A (Craig) may issue a "like" 607 to user 100B2 (Angela), seeking to obtain a match with user 100B2. As shown in pseudocode excerpt 700B, user 100A may only be able to issue the "like" if he is not currently in a saturated state (i.e., if the accumulated matches for user 100A is below the maximum).

Upon being notified of the "like", user 100B2 may accept the "like", responding with a "like" 607 of user 100A. Referring also to FIG. 6G, there is shown an example depicting user's 100B2 device 101B2, including profile picture 504A of user 100A. Once user 100B12 accepts the "like" from user 100, a match may be automatically established between users 100A and 100B2, and a conversation may automatically be initiated, for example via a messaging component of the dating app. As shown in pseudocode excerpt 700C, user 100B2 may only be able to accept the "like" if she is not currently in a saturated state (i.e., if the accumulated matches for user 100B2 is below the maximum).

Referring now to FIG. 6H, there is shown a next step in the process, wherein a match 605 is established between users 100A and 101B2. As a result, user 100B2 now appears in My Matches area 604A of user's 100A device 101A (along with user 100B1 who was previously matched with user 100A), and user 100A now appears in My Matches area 604B2 of user's 100B2 device 101B2.

As shown in pseudocode excerpt 700D, accumulated matches 603A for user 100A and accumulated matches 603B2 for user 100B2 may both be incremented by one when match 605 is established.

Referring now to FIG. 6I, there is shown a next step in the process. User 100A may again browse through cloud 601 of users 100 and view 606 a profile for user 100B3, a woman named Jenna. FIG. 6I depicts user's 100A device 101A, including profile picture 504B3 of user 100B3. Additional elements of user's 100B3 profile may also be shown.

As shown in pseudocode excerpt 700A, user 100A may only browse other users if the current total number of matches is less than or equal to a limit M, which in this example is three. As shown in FIG. 6I, the current running total of accumulated matches 603A for user 100A is currently two.

Referring now to FIG. 6J, there is shown a next step in the process. Here, user 100A (Craig) may issue a "like" 607 to user 100B3 (Jenna), seeking to obtain a match with user 100B3. As shown in pseudocode excerpt 700B, user 100A may only be able to issue the "like" if he is not currently in a saturated state (i.e., if the accumulated matches for user 100A is below the maximum).

Upon being notified of the "like", user 100B3 may accept the "like", responding with a "like" 607 of user 100A. Referring also to FIG. 6K, there is shown an example depicting user's 100B3 device 101B3, including profile picture 504A of user 100A. Once user 100B3 accepts the "like" from user 100, a match may be automatically established between users 100A and 100B3, and a conversation may automatically be initiated, for example via a messaging component of the dating app. As shown in pseudocode excerpt 700C, user 100B3 may only be able to accept the "like" if she is not currently in a saturated state (i.e., if the accumulated matches for user 100B3 is below the maximum).

Referring now to FIG. 6L, there is shown a next step in the process, wherein a match 605 is established between users 100A and 101B3. As a result, user 100B3 now appears in My Matches area 604A of user's 100A device 101A (along with users 100B1 and 100B2, who were previously matched with user 100A), and user 100A now appears in My Matches area 604B3 of user's 100B3 device 101B3.

As shown in pseudocode excerpt 700D, accumulated matches 603A for user 100A and accumulated matches 603B3 for user 100B3 may both be incremented by one when match 605 is established.

At this point, user 100A is saturated (i.e., placed in "matches saturated" mode), since his accumulated matches 603A has reached the maximum of three. Referring again to FIG. 7C, this condition is shown in pseudocode excerpt 700E. In at least one embodiment, once saturated, user 100A is prevented from being able to browse cloud 601 of other users 100. Alternatively, he may be able to browse cloud 601 but may not be permitted to "like" anyone new. In addition, user 100A may be removed from cloud 601 of users 100, effectively becoming invisible to all others except his three previously established matches. Referring again to FIG. 7C, this condition is also shown in pseudocode excerpt 700A.

In the depicted example, user 100A now has three private connections established separately with users 100B1, 100B2, and 100B3, and may be visible to them. User 100A may be locked into this mode until at least one of the matches is deleted, either by user 100A or one of users 100B1, 100B2, and 100B3. Once at least one of these matches is deleted, the saturation condition is automatically cleared. Cloud 601 of users 100 may again become available and visible to user 100A, and he may likewise be visible to cloud 601 of users 100.

In at least one embodiment, while user 100A is saturated, message 591 as depicted in FIG. 5J may be displayed on his screen.

Referring now to FIG. 6M, there is shown a next step in the process, wherein user 100A deletes the match with (i.e., "unmatches") user 100B3. In at least one embodiment, this may be done by, for example, opening messaging area 609A for user 100B3 and tapping on delete button 608, which may be indicated as a red X. In at least one embodiment, this deletes the match with user 100B3, ending the conversation. As shown in pseudocode excerpt 700F, this action causes accumulated matches 603A to be decremented by one.

Once the match between users 100A and 100B3 has been deleted, user 100A is once again able to browse cloud 601 of other users 100. However, users 100B3 and 100A may be permanently deleted from each other's view.

Referring now to FIG. 6N, there is shown My Matches area 604A of user's 100A device 101A, which now includes users 101B1 and 101B2, but not user 101B3. Also shown is My Matches area 604B3 of user's 100B3 device 101B3, which is now empty. Accumulated matches 603A for user 100A is now two, and accumulated matches 603B3 for user 100B3 is now zero.

The present system and method have been described in particular detail with respect to possible embodiments. Those of skill in the art will appreciate that the system and method may be practiced in other embodiments. First, the particular naming of the components, capitalization of terms, the attributes, data structures, or any other programming or structural aspect is not mandatory or significant, and the mechanisms and/or features may have different names, formats, or protocols. Further, the system may be implemented via a combination of hardware and software, or entirely in hardware elements, or entirely in software elements. Also, the particular division of functionality between the various system components described herein is merely exemplary, and not mandatory; functions performed by a single system component may instead be performed by multiple components, and functions performed by multiple components may instead be performed by a single component.

Reference in the specification to "one embodiment" or to "an embodiment" means that a particular feature, structure, or characteristic described in connection with the embodiments is included in at least one embodiment. The appearances of the phrases "in one embodiment" or "in at least one embodiment" in various places in the specification are not necessarily all referring to the same embodiment.

Various embodiments may include any number of systems and/or methods for performing the above-described techniques, either singly or in any combination. Another embodiment includes a computer program product comprising a non-transitory computer-readable storage medium and computer program code, encoded on the medium, for causing a processor in a computing device or other electronic device to perform the above-described techniques.

Some portions of the above may be presented in terms of algorithms and symbolic representations of operations on data bits within a memory of a computing device. These algorithmic descriptions and representations may be the means used by those skilled in the data processing arts to convey the substance of their work most effectively to others skilled in the art. An algorithm is here, and generally, conceived to be a self-consistent sequence of steps (instructions) leading to a desired result. The steps may be those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "displaying" or "determining" or the like, refer to the action and processes of a computer system, or similar electronic computing module and/or device, that manipulates and transforms data represented as physical (electronic) quantities within the computer system memories or registers or other such information storage, transmission or display devices.

Certain aspects include process steps and instructions described herein in the form of an algorithm. It should be noted that the process steps and instructions may be embodied in software, firmware and/or hardware, and when embodied in software, may be downloaded to reside on and be operated from different platforms used by a variety of operating systems.

The present document also relates to an apparatus for performing the operations herein. This apparatus may be specially constructed for the required purposes, or it may comprise a general-purpose computing device selectively activated or reconfigured by a computer program stored in the computing device. Such a computer program may be stored in a computer readable storage medium, such as, but is not limited to, any type of disk including floppy disks, optical disks, CD-ROMs, DVD-ROMs, magnetic-optical disks, read-only memories (ROMs), random access memories (RAMs), EPROMs, EEPROMs, flash memory, solid state drives, magnetic or optical cards, application specific integrated circuits (ASICs), or any type of media suitable for storing electronic instructions, and each coupled to a computer system bus. Further, the computing devices referred to herein may include a single processor or may be architectures employing multiple processor designs for increased computing capability.

The algorithms and displays presented herein are not inherently related to any particular computing device, virtualized system, or other apparatus. Various general-purpose systems may also be used with programs in accordance with the teachings herein, or it may prove convenient to construct more specialized apparatus to perform the required method steps. The required structure for a variety of these systems will be apparent from the description provided herein. In addition, the system and method are not described with reference to any particular programming language. It will be appreciated that a variety of programming languages may be used to implement the teachings described herein, and any references above to specific languages are provided for disclosure of enablement and best mode.

Accordingly, various embodiments include software, hardware, and/or other elements for controlling a computer system, computing device, or other electronic device, or any combination or plurality thereof. Such an electronic device may include, for example, a processor, an input device (such as a keyboard, mouse, touchpad, microphone, and/or any combination thereof), an output device (such as a screen, speaker, and/or the like), memory, long-term storage (such as magnetic storage, solid state storage, and/or the like), and/or network connectivity, according to techniques that may be well known in the art. Such an electronic device may be portable or non-portable. Examples of electronic devices that may be used for implementing the described system and method include: a smartphone, kiosk, server computer, enterprise computing device, desktop computer, laptop computer, tablet computer, consumer electronic device, or the like. An electronic device may use any operating system such as, for example and without limitation: Linux; Microsoft Windows, available from Microsoft Corporation of Redmond, Washington; MacOS, available from Apple Inc. of Cupertino, California; iOS, available from Apple Inc. of Cupertino, California; Android, available from Google, Inc. of Mountain View, California; and/or any other operating system that is adapted for use on the device.

While a limited number of embodiments have been described herein, those skilled in the art, having benefit of the above description, will appreciate that other embodiments may be devised. In addition, it should be noted that the language used in the specification has been principally selected for readability and instructional purposes, and may not have been selected to delineate or circumscribe the subject matter. Accordingly, the disclosure is intended to be illustrative, but not limiting, of scope.

What is claimed is:

1. A computer-implemented method for limiting matches between users in a networked environment, the method comprising, at a first network-connected hardware processing device:
   determining whether a first user has reached a limit of concurrent matches, wherein each match represents a bidirectional connection between the first user and another user;
   responsive to the first user not having reached the limit of concurrent matches representing bidirectional connections, making the first user visible to other users;
   responsive to the first user having reached the limit of concurrent matches representing bidirectional connections, making the first user invisible to other users;
   receiving input from the first user requesting that a unidirectional indication of interest in a second user be transmitted;
   responsive to the first user having reached the limit of concurrent matches representing bidirectional connections, declining the request to transmit the unidirectional indication of interest; and
   responsive to the first user not having reached the limit of concurrent matches representing bidirectional connections, transmitting the unidirectional indication of interest.

2. The method of claim 1, further comprising, responsive to the first user not having reached the limit of concurrent matches representing bidirectional connections, subsequent to transmitting the unidirectional indication of interest:
   receiving a signal from a second network-connected hardware processing device operated by the second user, the signal comprising a response to the transmitted unidirectional indication of interest; and responsive to the response indicating that the second user has an interest in the first user, establishing a match representing a bidirectional connection between the first and second users.

3. The method of claim 2, wherein establishing the match representing the bidirectional connection between the first and second users comprises initiating a communication channel between the first and second users.

4. The method of claim 2, wherein:
establishing the match representing the bidirectional connection between the first and second users comprises incrementing a concurrent match counter for each of the first and second users; and
determining whether the first user has reached the limit of concurrent matches representing bidirectional connections comprises determining whether the concurrent match counter for the first user is equal to or greater than the limit of concurrent matches representing bidirectional connections.

5. The method of claim 4, wherein establishing the match representing the bidirectional connection between the first and second users comprises:
initiating a communication channel between the first and second users;
the method further comprising, responsive to receiving input from at least one of the first and second user to terminate the match:
terminating the communication channel between the first and second users; and
decrementing the concurrent match counter for each of the first and second users.

6. The method of claim 1, wherein the steps of determining whether the first user has reached the limit of concurrent matches representing bidirectional connections, making the first user visible to other users, making the first user invisible to other users, receiving input from the first user, declining the request to transmit the unidirectional indication of interest, and transmitting the unidirectional indication of interest are performed by a dating software application.

7. The method of claim 1, further comprising:
responsive to the first user not having reached the limit of concurrent matches representing bidirectional connections, making the first user available to be matched with other users; and
responsive to the first user having reached the limit of concurrent matches representing bidirectional connections, making the first user unavailable to be matched with other users.

8. The method of claim 1, wherein declining the request to transmit the unidirectional indication of interest comprises outputting, on an output device of the first network-connected hardware processing device, an indication that the concurrent match limit has been reached.

9. A non-transitory computer-readable medium for limiting matches between users in a networked environment, comprising instructions stored thereon, that when performed by a first network-connected hardware processing device, perform the steps of:
determining whether a first user has reached a limit of concurrent matches, wherein each match represents a bidirectional connection between the first user and another user;
responsive to the first user not having reached the limit of concurrent matches representing bidirectional connections, making the first user visible to other users;
responsive to the first user having reached the limit of concurrent matches representing bidirectional connections, making the first user invisible to other users;
causing an input device to receive input from the first user requesting that a unidirectional indication of interest in a second user be transmitted;
responsive to the first user having reached the limit of concurrent matches representing bidirectional connections, declining the request to transmit the unidirectional indication of interest; and
responsive to the first user not having reached the limit of concurrent matches representing bidirectional connections, transmitting the unidirectional indication of interest.

10. The non-transitory computer-readable medium of claim 9, further comprising instructions stored thereon, that when performed by a first network-connected hardware processing device, perform the steps of, responsive to the first user not having reached the limit of concurrent matches representing bidirectional connections, subsequent to transmitting the unidirectional indication of interest:
receiving a signal from a second network-connected hardware processing device operated by the second user, the signal comprising a response to the transmitted indication of interest; and
responsive to the response indicating that the second user has an interest in the first user, establishing a match representing a bidirectional connection between the first and second users.

11. The non-transitory computer-readable medium of claim 10, wherein establishing the match representing the bidirectional connection between the first and second users comprises initiating a communication channel between the first and second users.

12. The non-transitory computer-readable medium of claim 10, wherein:
establishing the match representing the bidirectional connection between the first and second users comprises incrementing a concurrent match counter for each of the first and second users; and
determining whether the first user has reached the limit of concurrent matches representing bidirectional connections comprises determining whether the concurrent match counter for the first user is equal to or greater than the limit of concurrent matches representing bidirectional connections.

13. The non-transitory computer-readable medium of claim 12, wherein establishing the match representing the bidirectional connection between the first and second users comprises:
initiating a communication channel between the first and second users;
the non-transitory computer-readable medium further comprising instructions stored thereon, that when performed by a first network-connected hardware processing device, perform the steps of, responsive to receiving input from at least one of the first and second user to terminate the match:
terminating the communication channel between the first and second users; and
decrementing the concurrent match counter for each of the first and second users.

14. The non-transitory computer-readable medium of claim 9, wherein the steps of determining whether the first user has reached the limit of concurrent matches representing bidirectional connections, making the first user visible to other users, making the first user invisible to other users, receiving input from the first user, declining the request to transmit the unidirectional indication of interest, and transmitting the unidirectional indication of interest are performed by a dating software application.

15. The non-transitory computer-readable medium of claim 9, further comprising instructions stored thereon, that when performed by a first network-connected hardware processing device, perform the steps of:
   responsive to the first user not having reached the limit of concurrent matches representing bidirectional connections, making the first user available to be matched with other users; and
   responsive to the first user having reached the limit of concurrent matches representing bidirectional connections, making the first user unavailable to be matched with other users.

16. The non-transitory computer-readable medium of claim 9, wherein declining the request to transmit the unidirectional indication of interest comprises causing an output device of the first network-connected hardware processing device to output an indication that the concurrent match limit has been reached.

17. A system for limiting matches between users in a networked environment, comprising, in a first network-connected device operated by a first user:
   an input device, configured to receive input from the first user requesting that a unidirectional indication of interest in a second user be transmitted;
   a processor, communicatively coupled to the input device, configured to:
      determine whether the first user has reached a limit of concurrent matches, wherein each match represents a bidirectional connection between the first user and another user;
      responsive to the first user not having reached the limit of concurrent matches representing bidirectional connections, make the first user visible to other users;
      responsive to the first user having reached the limit of concurrent matches representing bidirectional connections:
         make the first user invisible to other users; and
         decline the request to transmit the unidirectional indication of interest; and
   a network communication component, communicatively coupled to the processor, configured to, responsive to the first user not having reached the limit of concurrent matches representing bidirectional connections, transmit the unidirectional indication of interest.

18. The system of claim 17, wherein, responsive to the first user not having reached the limit of concurrent matches representing bidirectional connections, subsequent to transmitting the unidirectional indication of interest:
   the network communication component is further configured to receive a signal from a second network-connected device operated by the second user, the signal comprising a response to the transmitted unidirectional indication of interest; and
   the processor is further configured to, responsive to the response indicating that the second user has an interest in the first user, establish a match representing a bidirectional connection between the first and second users.

19. The system of claim 18, wherein establishing the match representing the bidirectional connection between the first and second users comprises initiating a communication channel between the first and second users.

20. The system of claim 18, wherein:
   establishing the match representing the bidirectional connection between the first and second users comprises incrementing a concurrent match counter for each of the first and second users; and
   determining whether the first user has reached the limit of concurrent matches representing bidirectional connections comprises determining whether the concurrent match counter for the first user is equal to or greater than the limit of concurrent matches representing bidirectional connections.

21. The system of claim 20, wherein establishing the match between the first and second users comprises:
   initiating a communication channel between the first and second users;
   and wherein the processor is further configured to, responsive to an indication that at least one of the first and second users wishes to terminate the match:
      terminate the communication channel between the first and second users; and
   decrement the concurrent match counter for the first user.

22. The system of claim 17, wherein the input device, the processor, and the network communication component operate under the direction of a dating software application running on the first network-connected device.

23. The system of claim 17, wherein the processor is further configured to:
   responsive to the first user not having reached the limit of concurrent matches representing bidirectional connections, make the first user available to be matched with other users; and
   responsive to the first user having reached the limit of concurrent matches representing bidirectional connections, make the first user unavailable to be matched with other users.

24. The system of claim 17, further comprising, in the first network-connected device:
   an output device, communicatively coupled to the processor;
   wherein declining the request to transmit the unidirectional indication of interest comprises causing the output device to output an indication that the concurrent match limit has been reached.

\* \* \* \* \*